US012205446B2

(12) United States Patent
Tugendhaft et al.

(10) Patent No.: US 12,205,446 B2
(45) Date of Patent: Jan. 21, 2025

(54) SENSING DEVICE FOR ACCESS POINT

(71) Applicant: Essence Security International (E.S.I.) Ltd., Herzlia Pituach (IL)

(72) Inventors: Nissim Tugendhaft, Netanya (IL); Boaz Menis, Kibbutz NaAn (IL); Ohad Amir, Herzlia (IL)

(73) Assignee: Essence Security International (E.S.I.) Ltd., Herzlia Pituach (IL)

( * ) Notice: Subject to any disclaimer, the term of this patent is extended or adjusted under 35 U.S.C. 154(b) by 0 days.

(21) Appl. No.: 18/448,140

(22) Filed: Aug. 10, 2023

(65) Prior Publication Data

US 2023/0386313 A1 Nov. 30, 2023

Related U.S. Application Data

(63) Continuation of application No. 18/009,386, filed as application No. PCT/IL2021/050702 on Jun. 10, 2021, now Pat. No. 11,769,384.

(30) Foreign Application Priority Data

Jun. 10, 2020 (GB) ..................................... 2008826

(51) Int. Cl.
*G08B 13/24* (2006.01)
*G08B 29/14* (2006.01)
*G08B 29/26* (2006.01)

(52) U.S. Cl.
CPC ......... *G08B 13/2494* (2013.01); *G08B 29/14* (2013.01); *G08B 29/26* (2013.01)

(58) Field of Classification Search
CPC .................................................. G08B 13/2494
See application file for complete search history.

(56) References Cited

U.S. PATENT DOCUMENTS 8,970,373 B2 3/2015 Buckley et al.
9,790,736 B2 10/2017 Kincaid et al.
(Continued)

FOREIGN PATENT DOCUMENTS

EP 2693221 A1 2/2014
EP 3498947 A1 6/2019
(Continued)

OTHER PUBLICATIONS

Foreign Communication from a Related Counterpart Application, International Search Report and Written Opinion dated Sep. 25, 2021, International Application No. PCT/IL2021/050702 filed on Jun. 10, 2021.
(Continued)

*Primary Examiner* — Travis R Hunnings
(74) *Attorney, Agent, or Firm* — Conley Rose, P.C.

(57) ABSTRACT

A method of operating a sensing component for sensing a magnetic field to determine a state of an access point having a first component and a second component that are separable from each other to create an opening and wherein a magnet is mounted on one of the first or second components of the access point, wherein the method comprises: operating the sensing component to sense a magnetic field in multiple dimensions to produce a sample representation of the sensed magnetic field, wherein the sample representation is a multi-dimensional representation and determining whether the sample representation is in a pre-determined region about a reference representation that is representative of a state of an access point to determine that the sensed magnetic field corresponds to said state of the access point, wherein the pre-determined region comprises a circular cross-section.

21 Claims, 16 Drawing Sheets

(56) References Cited

U.S. PATENT DOCUMENTS

| | | | | |
|---|---|---|---|---|
| 11,255,674 | B2 * | 2/2022 | Eitel | G01R 33/00 |
| 2004/0263329 | A1 * | 12/2004 | Cargonja | G08B 13/2494 340/539.22 |
| 2007/0118312 | A1 * | 5/2007 | Cech | B60R 21/0136 702/65 |
| 2008/0315865 | A1 | 12/2008 | Doogue et al. | |
| 2013/0120138 | A1 * | 5/2013 | Hicks, III | G08B 25/014 340/538 |
| 2015/0348385 | A1 | 12/2015 | Lamb et al. | |
| 2016/0054148 | A1 | 2/2016 | Misfatto | |
| 2016/0345406 | A1 | 11/2016 | Donhowe et al. | |
| 2017/0098356 | A1 | 4/2017 | Dai et al. | |
| 2017/0131356 | A1 | 5/2017 | Boury | |
| 2017/0227386 | A1 | 8/2017 | Campero et al. | |
| 2017/0343379 | A1 * | 11/2017 | Amir | G08B 13/184 |
| 2019/0113346 | A1 * | 4/2019 | Eitel | G01R 33/10 |
| 2019/0179146 | A1 * | 6/2019 | De Nardi | G01B 7/004 |
| 2020/0209420 | A1 | 7/2020 | Amir et al. | |
| 2021/0201636 | A1 * | 7/2021 | Amir | G08B 29/26 |

FOREIGN PATENT DOCUMENTS

| | | | |
|---|---|---|---|
| EP | 3509046 | A1 | 7/2019 |
| WO | 2016005182 | A1 | 1/2016 |
| WO | 2020089121 | A1 | 5/2020 |
| WO | 2020089124 | A1 | 5/2020 |
| WO | 2020099371 | A1 | 5/2020 |
| WO | 2021250675 | A1 | 12/2021 |

OTHER PUBLICATIONS

Foreign Communication from a Related Counterpart Application, United Kingdom Search Report dated Oct. 16, 2020, United Kingdom Application No. 2008826.6 filed on Jun. 10, 2020.

Foreign Communication from a Related Counterpart Application, Notification Concerning Transmittal of International Preliminary Report on Patentability dated Dec. 22, 2022, International Application No. PCT/IL2021/050702 filed on Jun. 10, 2021.

Notice of Allowance dated May 10, 2023, U.S. Appl. No. 18/009,386, filed Dec. 9, 2022.

* cited by examiner

SENSING DEVICE FOR ACCESS POINT

CROSS-REFERENCE TO RELATED APPLICATIONS

The present application is a Continuation of U.S. application Ser. No. 18/009,386 filed on Dec. 9, 2022, which claims priority to the National Stage of International Application No. PCT/IL2021/050702, filed Jun. 10, 2021, entitled "Sensing Device for Access Point," which claims priority to United Kingdom Application No. 2008826.6 filed with the Intellectual Property Office of The United Kingdom on Jun. 10, 2020, all of which are incorporated herein by reference in their entirety for all purposes.

TECHNICAL FIELD

The present invention relates to a magnetic field sensing device for an access point.

BACKGROUND

An access point to an indoor or outdoor space may be provided via a door, gate or window. The state of the access point be may detected by a device installed on the entry point, the device having a magnetic part and a magnetic field sensing part, the respective parts being installed on different components of the access point. For example, a first moveable component, for example, a door, window or gat and a second fixed component, for example, door or window frame or gate post.

Such devices are subjectable to tampering attempts. For example, an intruder may place a magnet of their own adjacent the magnetic sensor so that the magnetic sensor does not sense a magnetic field absence when the entry point is opened, and thus does not detect that the state of the entry point has changed from closed to opened.

While various solutions have been attempted for detection of tampering attempts, there continues to be a need for further solutions. For example, known devices may not be able to distinguish between an open state of an access point and a tamper state. In addition, monitoring a magnetic field may drain a battery in a sensing device. There is a need for alternative devices for monitoring access points that provide improvements in battery life. In addition, known devices may be configured for particular types of access points and may not be used at other types of access points. For example, in certain geometric configurations, certain devices may be less sensitive to detecting opening and closing of the access point. Therefore, there is a need for an alternative device that is adaptable to being installed in different locations and at different types of access point.

The devices and methods described in the present application may solve one or more of the above problems above and/or provide useful market alterative(s).

Reference to any prior art in this specification is not an acknowledgement or suggestion that this prior art forms part of the common general knowledge in any jurisdiction, or globally, or that this prior art could reasonably be expected to be understood, regarded as relevant/or combined with other pieces of prior art by a person skilled in the art.

SUMMARY OF THE INVENTION

In accordance with a first aspect, there is provided a device for determining a state of an access point, the access point having a first component and a second component that are separable from each other to create an opening to access a premises or part thereof, wherein a magnet is mounted on one of the first or second components of the access point, and wherein the device comprises:

- a sensing component for sensing a magnetic field and producing sensor output in response to sensing the magnetic field, wherein the sensing component is mounted on the other of the first or second components of the access point from the magnet;
- processing circuitry configured to process said sensor output to produce a sample representation of the sensed magnetic field, wherein the processing circuitry is further configured to:
  - perform a state classification process on the sample representation to determine a state associated with the access point, wherein the state classification process is based on a relationship between the sample representation and (i) a first representation representative of the access point being in a closed state and (ii) a second representation being representative of the access point being in an open state,
  - wherein the state is determined to be one of a group of states comprising: an open state and a closed state.

The state classification process may comprise comparing the sample representation with the first representation. The state classification process may comprise comparing the sample representation with the second representation. The state classification process may comprise selecting the state of the access point from the group of states.

A device provided in accordance with the first aspect may be an improved or more adaptable device for monitoring the state of an access point.

The first representation may be obtained from reference data. The second representation may be obtained from reference data.

The group of states may further comprise a tamper state. The device may distinguish between an open and closed state. The device may distinguish between a tamper state and an open or closed state that is without tamper. The tamper state may occur when the access point is open or when the access point is closed. Determining the state associated with the access point may comprise determining an open state or a closed state that correspond to an open non-tampered state or a closed non-tampered state, respectively.

The state classification process may further comprise determining that at least one magnetic tamper condition is satisfied by the sample representation. The at least one magnetic tamper condition may be based on the first and second representations. The at least one magnetic tamper condition may comprise a single magnetic tamper condition.

The at least one magnetic tamper condition may be satisfied when the sample representation lies outside an expected transition path between the first representation and the second representation.

The at least one magnetic tamper condition may be based on a first quantity that is a sum of a first measure of distance between the sample representation and the first representation and a second measure of distance between the sample representation and the second representation. The at least one tamper condition may be based on a second quantity that is a third measure of distance between the first representation and the second representation. The at least one tamper condition may be based on a value of a ratio between a first quantity and a second quantity being smaller than a predetermined threshold value. The at least one tamper condition may be based on a value of a ratio between a first quantity and a second quantity being larger than a pre-determined threshold value.

The at least one tamper condition may represent a tampering event that affects the sensed magnetic field. The tampering event may be a magnetic tamper corresponding to a would-be intruder applying another magnet near the sensing component. The tampering event may comprise other forms of tamper that affect the sensed magnetic field. The tampering event may be a physical tamper whereby the sensing component is forcibly removed from its mounted location. The physical tamper may result in an uncharacteristic magnetic field being sensed and therefore a determination that a magnetic tamper has occurred.

The processing circuitry may be configured to calculate the first quantity, the second quantity and the ratio between the first quantity and the second quantity and compare the ratio to the pre-determined threshold value.

The state classification process may comprise determining that the sample representation is closer to either the first representation or the second representation and classifying the state based on which of the first and second representations is closer.

The state classification process may comprise determining whether the sample representation is in a first region about the first representation. The state classification process may comprise determining whether the sample representation is in a second region about the second representation. The state classification process may comprise determining whether the sample representation is in a first region about the first representation or is in a second region about the second representation.

The processing circuitry may be configured to transmit values corresponding to boundaries of the first and/or the second regions to further processing circuitry for use in a change of state determination process.

The processing circuitry may be configured to perform a change of state determination process and use said values as part of the change of state determination process.

The first and second regions may overlap to form an overlap region. The first and second regions may each have a size in dependence on one or more statistical parameters determined from reference data.

The first representation and/or the second representation may be determined by using a machine learning process performed on reference data.

The machine learning process may comprise clustering reference data into a first group representative of the access point in an open state and into a second group representative of the access point in a closed state.

The machine learning process may comprise applying a k-means clustering process on reference data.

The sample representation may comprise a three-dimensional vector wherein each component of the three-dimensional vector corresponds to a measurement of the magnetic field in a spatial dimension.

The processor may be further configured to perform an update process on at least one of the first and second representations using the sample representation and an outcome of the state classification process.

The update process may comprise updating the first representation using the sample representation if the sample representation is determined to be representative of the access point being in the closed state and updating the second representation using the sample representation if the sample representation is determined to be representative of the access point being in the open state.

The processor may be configured to perform a calibration process thereby to determine the first and second representations, wherein the calibration process comprises:

- operating the sensing component to sense the magnetic field when the first and second components of the access point are arranged to be open and closed thereby to collect reference data corresponding to the open and closed states;
- determining the first and second representations using at least the collected reference data.

Determining the first and second representations from the collected reference data may comprise performing a machine learning or statistical process on at least the collected reference data. The machine learning or statistical process may comprise clustering the reference data into a first group corresponding to the open state and a second group corresponding to the closed state. In accordance with a second aspect, there is provided a kit of parts comprising the device provided in accordance with the first aspect; and a magnet for mounting on said one of the first or second components of the access point.

In accordance with a third aspect, there is provided a method of determining a state of an access point, the access point having a first component and a second component that are separable from each other to create an opening to access a premises or part thereof, wherein a magnet is mounted on one of the first or second components of the access point and the sensing component is mounted on the other of the first or second components of the access point from the magnet, the method comprising:

- receiving a sensor output from a sensing component in response to the sensing component sensing a magnetic field;
- processing said sensor output to produce a sample representation of the sensed magnetic field;
- performing a state classification process on the sample representation, wherein the state classification process is based on a relationship between the sample representation and (i) a first representation being representative of the access point being in a closed state and (ii) a second representation being representative of the access point being in an open state wherein the state is determined to be one of a group of states comprising: an open state and a closed state.

In accordance with a fourth aspect there is provided a non-transitory computer readable medium comprising instructions operable by processing circuitry to perform the method provided in accordance with the third aspect.

In accordance with a fifth aspect there is provided a method of calibrating the device provided in accordance with the first aspect, wherein the method comprises:

- mounting the magnet on one of the first or second components of the access point;
- providing the sensing component on the other of the first or second components of the access point;
- arranging the first component and second component to provide the access point in a plurality of configurations;
- sensing the magnetic field with the sensing component when the access point is provided in each of the plurality of configurations thereby to collect reference data;
- processing, using the processing circuitry, the collected reference data to determine the first and second representations.

In accordance with a sixth aspect there is provided a non-transitory computer readable medium comprising instructions operable by processing circuitry to perform the method of: obtaining reference data representative of sensor output of a sensing component of a device for determining the state of an access point, wherein the reference data is representative of the access point in a plurality of configurations and processing said reference data to determine first and second representations from the reference data, wherein the first representation is representative of the access point being in an open state and the second representation is representative of the access point being in a closed state.

In accordance with a seventh aspect, there is provided a method of operating a sensing component for sensing a magnetic field, wherein the sensing component is provided as part of a device for determining a state of an access point, the access point having a first component and a second component that are separable from each other to create an opening to access a premises or part thereof wherein a magnet is mounted on one of the first or second components of the access point and the sensing component is mounted on the other of the first or second components of the access point from the magnet, wherein the method comprises:

- operating the sensing component to sample a magnetic field at a first sampling rate;
- determining whether a magnetic field sample is representative of a potential change of state of the access point with respect to a pre-determined reference, wherein the magnetic field sample is sampled at the first sampling rate;
- in response to determining that the magnetic field sample is representative of a potential change of state of the access point, operating the sensing component to sample a magnetic field at a second, higher, sampling rate; and
- performing a state determination process using at least one magnetic sample sampled at the second, higher sampling rate.

By providing a method in accordance with the seventh aspect, improvements in battery life for devices that monitor access points may be obtained.

The state determination process of the seventh aspect may be or substantially correspond to or comprise the state classification process as described with reference to the first to sixth aspect.

Determining that the magnetic field sample is representative of a potential change of state of the access point may comprise determining that the magnetic field sample is representative or at least indicative of a change of state of the access point. Determining the magnetic field sample is representative of a potential change of state may comprise, or consist of, detecting an event. The event may represent a difference between the magnetic field sample and the pre-determined reference. The event may correspond to a divergence of the magnetic field sample from the pre-determined reference. The divergence may be caused by a change of state of the access point. The divergence may be caused by noise or other statistical effect on the sampled magnetic field sample.

The pre-determined reference may be representative of a most-recently determined state of the access point.

Determining whether the magnetic field sample is representative of a potential change of state of the access point may comprise comparing the magnetic field sample and/or a quantity derived therefrom to a boundary of a pre-determined region about the predetermined reference.

Determining whether the magnetic field sample is representative of a potential change of state of the access point may comprise comparing the magnetic field sample and/or a quantity derived therefrom to a pre-determined region.

The predetermined reference and/or the region about the representation of the sensed magnetic field may be obtained by performing a machine learning and/or statistical process on reference data acquired by the sensing component after being installed at the access point.

The potential change of state may be a potential change from a current state, the current state being selected from a group comprising of an open state and a closed state, wherein the predetermined reference is a representation of the magnetic field previously sensed by the sensing component when the access point was in the same state as the current state.

In an event that the state determination process determines that the state is unchanged the method may further comprise updating the pre-determined reference using the at least one sample captured at the higher sampling rate.

The state determination process may comprise performing a state classification process based on the at least one sample captured at the higher sampling rate.

The state determination process may further comprise operating the sensing component at the first sampling rate upon:

- completion of acquiring of said at least one sample captured at the faster sampling rate;
- and/or
- determining, from the state determination process, that the access point is in an open or closed state.

The state determination process of the seventh aspect may be or substantially correspond to or comprise the state classification process as described with reference to the first to sixth aspect. The state determination process may comprise performing a state classification process on a sample representation corresponding to the magnetic field sample sampled at the higher sampling rate thereby to determine a state associated with the access point. The state classification may be based on a relationship of the sample representation with (i) a first representation being representative of the access point being in a closed state and/or (ii) a second representation being representative of the access point being in an open state, wherein the state is selected from a group of states that comprises: an open state and a closed state.

The state classification process may comprise comparing the sample representation with the first representation and/or comparing the sample representation with the second representation.

The group of states may further comprise a tamper state. The device may distinguish between a tamper state and an open or closed state that is without tamper. The tamper state may occur when the access point is open or when the access point is closed. However, in embodiments in which a tamper state may be determined, determining an open state or closed state correspond to determining an open non-tampered state or a closed non-tampered state, respectively.

The state determination process may further comprise determining whether the access point is in a tamper state or not in a tamper state. The method may further comprise operating the sensing component to resume sampling at the first sampling rate in response to determining that the access point is not in a tamper state.

The first sampling rate may be in the range 0.5 Hz to 5 Hz. The second sampling rate may be in the range 5 Hz to 100 Hz.

The state determination process may comprise using only one sample sampled at the higher sampling rate. The state determination process may comprise discarding at least one sample sampled at the higher sampling rate. The method may further comprise determining an average magnetic sample from more than one sample sampled at the higher sampling rate and the state determination process may be performed on the average magnetic sample. The method may further comprise determining a combined magnetic field sample from at least one sample sampled at the lower sampling rate and at least one sample sampled at the higher sampling rate and performing the state determination process on the combined magnetic field sample.

Determining whether the magnetic field sample is representative of a potential change of state of the access point may comprise comparing the magnetic field sample and/or quantity derived therefrom to a boundary of a first predetermined region about the predetermined reference and wherein the state determination process comprises comparing at least one magnetic sample captured at the higher sampling rate to a boundary of a second pre-determined region about the predetermined reference.

The second pre-determined region may comprise a larger volume that the first pre-determined region. The first predetermined region may be a cube or a cuboid and the second pre-determined region may be a sphere. The cube or cuboid may be contained within the sphere. The cube or cuboid may be inscribed by the sphere. The first region may comprise a sphere and the second region may comprise a cube or cuboid. The cube or cuboid may be circumscribed around the sphere.

In accordance with an eight aspect there is provided a device for determining a state of an access point, the access point having a first component and a second component that are separable from each other to create an opening to access a premises or part thereof, wherein the device comprises processing circuitry configured to execute the method provided by the seventh aspect.

The device may further comprise the sensing component. The device may be provided physically separate to the sensing component.

The processing circuitry may comprise first processing circuitry associated with the sensing component and second processing circuitry. The first processing circuitry may be configured to determine whether the magnetic field sample is representative of a potential change of state of the access point with respect to a pre-determined reference. The second processing circuitry may be configured to perform the state determination process.

The first processing circuitry may be configured to wake-up the second processing circuitry from a low power or off state in response to determining that the magnetic field sample is representative of a potential change of state of the access point with respect to the pre-determined reference. The first processing circuitry may be configured to send a wake-up signal to the second processing circuitry.

In an event that the state determination process determines that the state of the access point has changed, the second processing circuitry is configured to control transmission of a notification of the change of state to a control hub. The device may further comprise a transceiver for transmitting the notification. The second processing circuitry may be configured to instruct the transceiver to transmit the notification. The transceiver may be inactive when the second processing circuitry is in said low power or off state.

The device may further comprise memory associated with the sensing component. The first processing circuitry may be configured to read only from the memory associated with the sensing component. The second processing circuitry may be configured to write only to the memory associated with the sensing component In accordance with a ninth aspect, there is provided a non-transitory computer readable medium comprising instructions operable by processing circuitry to perform the method according to the seventh aspect.

In accordance with a tenth aspect, there is provided a method of operating a sensing component for sensing a magnetic field to determine a state of an access point, the access point comprising a first component and a second component that are separable from each other to create an opening to access a premises or part thereof wherein a magnet is mounted on one of the first or second components of the access point, wherein the method comprises:

operating the sensing component to sense a magnetic field in multiple dimensions to produce a sample representation of the sensed magnetic field, wherein the sample representation is a multi-dimensional representation; and determining whether the sample representation is in a pre-determined region about a reference representation that is representative of a state of the access point thereby to determine that the sensed magnetic field corresponds to said state of the access point, wherein the pre-determined region comprises a circular cross-section.

By providing a method in accordance with the tenth aspect, a more sensitive device, in particular, for detection of opening and closing of access points of different geometric configuration may be obtained. The sensing component may be provided to determine the state of the access point or as part of device configured to determine the state of the access point.

The method may further comprise determining a measure of distance between the sample representation and a reference representation that is representative of a state of the access point.

The predetermined region may be circular in a plane defined by 2 orthogonal dimensions of the multiple dimensions. The multiple dimensions may be 3 dimensions. Each plane may be defined by two orthogonal Cartesian dimensions of the 3 dimension dimensions.

The pre-determined region may be substantially spherical. The predetermined region may be substantially cylindrical. The predetermined sphere may be, for example, a sphere or a cylinder.

The pre-determined region may comprise a multi-dimensional polygon that is representative of a sphere. The pre-determined region may comprises a circular cross-section that is approximately circular as determined by a numerical precision. The numerical precision may be pre-determine or pre-selected.

The sample representation may be at a center of the pre-determined region. The sample representation may at a shifted position relative to the center of the pre-determined region, wherein the shift is representative of an update process performed in response to determining that the sensed magnetic field corresponds to said state of the access point.

Determining a measure of distance may comprise determining a multi-dimensional difference vector between the sample representation and the reference representation. The method may further comprise performing one or more mathematical functions on the multi-dimensional difference vector and/or the components of the multi-dimensional difference vector to provide a single value of measure and the method comprises further comprising comparing the single value of measure to a pre-determined threshold value.

The multi-dimensional difference vector may be a 3-dimensional distance vector.

The method may further comprise comparing the magnitude of the distance vector to a pre-determined threshold value.

The method may further comprise performing one or more mathematical functions on the multi-dimensional difference vector and/or the components of the multi-dimensional difference vector.

The one or more mathematical functions may comprise a weighted sum using the components of the difference vector and wherein the weights are determined based at least on a classification process performed on reference data.

The shape and/or the size of the pre-determined region may be characterized by one or more parameters and the one or more parameters are determined by a classification process performed on reference data.

The reference representation may be updated in response to receiving a calibration request.

The pre-determined region may be a first pre-determined region and wherein the method further comprises using the determined measure of distance to determine that the sample representation is in a second, larger, pre-determined region in response to determining that the sample representation is in the first pre-determined region.

The first pre-determined region may comprise a first shape and the second pre-determined region comprises a second shape. The first shape may be different to the second shape.

The method may comprise, in response to determining that the sensed magnetic field corresponds to said state of the access point, updating the size and/or off-set of the pre-determined region.

Determining whether the sample representation is in a pre-determined region about a reference representation that is representative of a state of the access point thereby to determine that the sensed magnetic field corresponds to said state of the access point may comprise determining that the sample representation is in the pre-determined region or is not in the pre-determined region.

The method may further comprise performing a state classification process on the sample representation in response to determining that the sample representation is not in the pre-determined region. The state classification process may correspond to the state classification process of any of the first to sixth aspects. Additionally or alternatively, the method may further comprise operating the sensing component to sample a magnetic field at a second, higher, sampling rate in response to determining that the sample representation is not in the pre-determined region. Alternatively, the method may confirm that the sample representation is not in said state in response to determining that the sample representation is not in the pre-determined region. The method may determine that the sample representation is in a different state in response to determining that the sample representation is not in the pre-determined region.

In accordance with an eleventh aspect, there is provided a device for determining a state of an access point, the access point having a first component and a second component that are separable from each other to create an opening to access a premises or part thereof, wherein a magnet is mounted on one of the first or second components of the access point, and wherein the device comprises:

- processing circuitry configured to execute the method according to the tenth aspect.

The device may comprise the sensing component.

In accordance with a twelfth aspect there is provided a non-transitory computer readable medium comprising instructions operable by processing circuitry to perform the method of the tenth aspect.

In accordance with a thirteenth aspect, there is provide a method of calibrating a device for determining a state of an access point, the access point having a first component and a second component that are separable from each other to create an opening to access a premises or part thereof wherein the device comprises a sensing component, wherein the method comprises:

- providing a magnet on one of the first or second components of the access point;
- providing the sensing component on the other of the first or second components of the access point;
- arranging the first component and second component thereby to provide the access point in a plurality of configurations;
- sensing the magnetic field with the sensing component when the access point is provided in each of the plurality of configurations thereby to collect reference data;
- processing the collected reference data to determine a first representation corresponding to a closed state and a second representations corresponding to an open state, wherein at least the first representation is for use in determining whether the access point is in a closed state.

The method may further comprise using the first and second representations in determining whether the access point is in a closed state.

The method may further comprise: moving the first and/or second component to provide the access point in a first configuration corresponding to the open state and sensing the magnetic field in the first configuration and moving the first and/or second component to provide the access point in a second configuration corresponding to the closed state and sensing the magnetic field in the second configuration.

The method may further comprise moving the first and/or second component to alternate the access point between a configuration corresponding to the open state and a configuration corresponding to the closed state, wherein the magnetic field is sensed in each configuration.

The access point may be provided in the plurality of configurations corresponding to the open and closed state during a pre-defined time window.

The method may comprise providing the access point in one of the open or closed configurations for at least a predefined portion of a pre-defined time window. The predefined portion may be a percentage in the range of 25 to 35% of the pre-defined time window. Processing the collected reference data comprising grouping the samples into a first group corresponding to the open state and a second group corresponding to a closed state.

The method may further comprise performing a machine learning process on the collected reference data.

The machine learning process may comprise a clustering algorithm.

The method may further comprise determining a first region corresponding to the open state and a second region corresponding to the closed state such that, for a further magnetic sample, the state of the access point is determined based on at least the location of the magnetic sample relative to the first and second regions. The first region and second region may be in a space that represents measured magnetic field or magnetic field strength.

The method may further comprise determining a first region in a space that represents measured magnetic field, the first region corresponding to the open state such that, for a further magnetic sample, the state of the access point is determined based on at least the location of the magnetic sample in the space, relative to the first region.

In accordance with a thirteenth aspect there is provided a non-transitory computer readable medium comprising instructions operable by processing circuitry to perform the method of:

obtaining reference data representative of sensor output of a sensing component of a device, wherein the device is configured to determine the state of an access point, wherein the reference data is representative of the access point in a plurality of configurations, wherein the method further comprises:

processing said reference data to determine first and second representations from the reference data, wherein the first representation is representative of the access point being in an open state and the second representation is representative of the access point being in a closed state.

In accordance with fourteenth aspect there is provided a kit of parts comprising the device of the eight aspect or the eleventh aspect and a magnet for mounting on one of the first or second components of the access point.

Any feature in one aspect of the invention may be applied to other aspects of the invention, in any appropriate combination. For example, device features may be applied as method features and vice versa.

BRIEF DESCRIPTION OF THE SEVERAL VIEWS OF THE DRAWINGS

Embodiments will now be described by way of example only, and with reference to the accompanying drawings, of which.

DETAILED DESCRIPTION OF THE EMBODIMENTS

Figure 1:
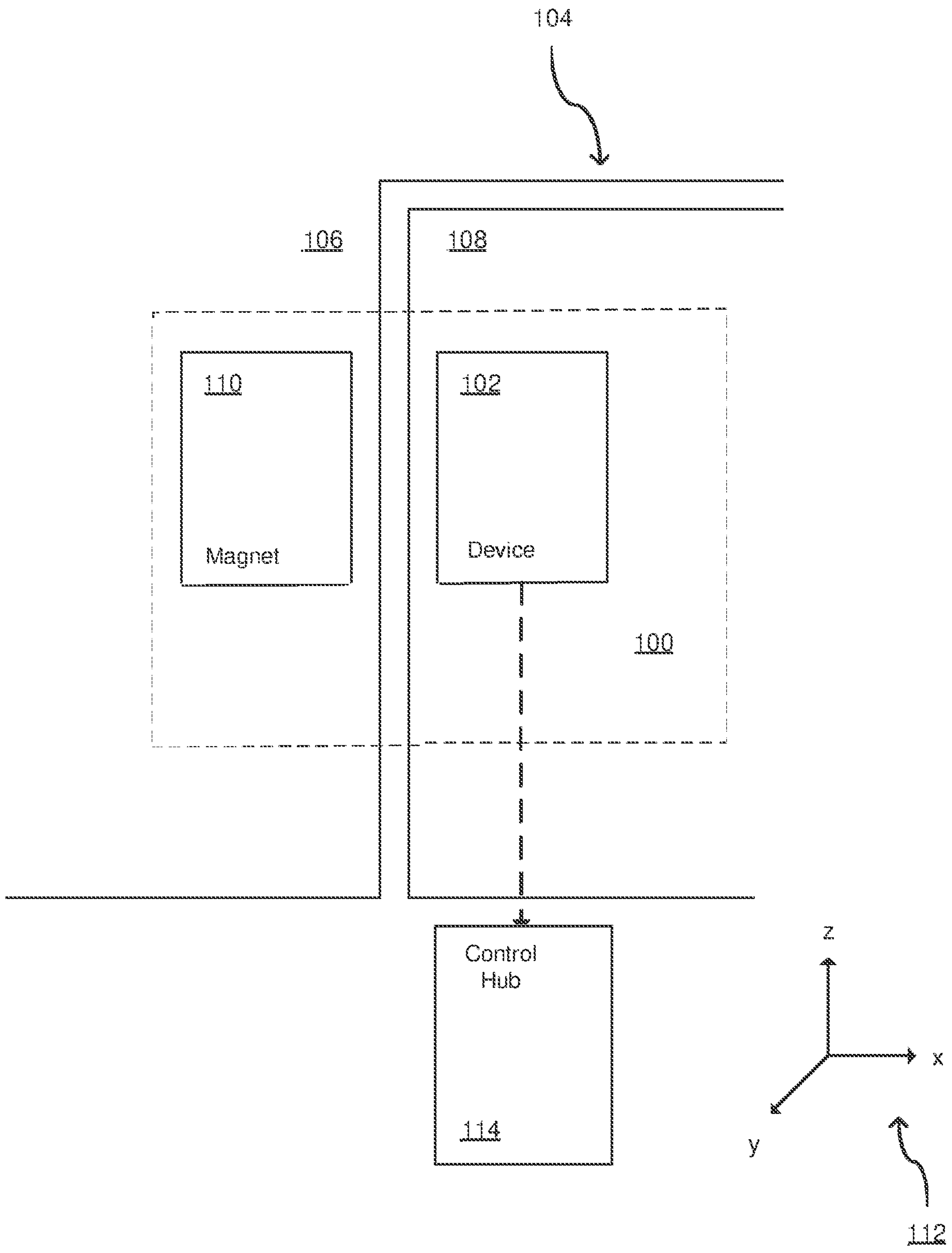
FIG. 1 is a schematic diagram of a system comprising a device for determining a state of an access point, in accordance with an embodiment, installed on an access point.

As used herein, except where the context requires otherwise, the terms "comprises", "includes", "has", and grammatical variants of these terms, are not intended to be exhaustive. They are intended to allow for the possibility of further additives, components, integers or steps.

In the following, a sensing system having a magnet and a sensing device is described. By sensing the magnetic field at an access point, the device can determine the state of an access point as open or closed. A potential intruder may attempt to tamper with the system to avoid detection by placing a tamper magnet at the access point in an attempt to emulate the magnetic field provided by the magnet, even when the access point is open. The devices, methods and systems described herein may provide a number of advantages over known devices, methods and systems.

As an overview of the operation of the device, which is described in further detail in the following, an initialization process is performed. The initialization process includes collecting reference or training data. By processing this data, a first reference region that corresponds to an open state of the access point and a second reference region that correspond to a closed region of the access point is determined in three dimensional magnetic field space. Following the initialization mode, the device collects samples at a low sample rate and tests each collected sample as part of a change of state determination process. The change of state determination process involves determining if the most recently collected sample is inside the region corresponding to the previously determined state. For example, if the most recent state was a closed state then it is determined if the sample is inside or outside the closed region.

If the sample is representative of a potential change of state, the device is moved to the higher power configuration in which samples are collected at a higher sampling rate. A state classification process is then performed on further samples. The state is then determined by, for example, by determining distances between the sample and the center points of the open and closed regions.

In some embodiments, the distances between the sample and the centre points of the open and closed regions are determined. In other embodiments, the distance from the one of the centre points (e.g. the current state, or in some embodiments the closed state) is sufficient to determine the state of the present sample. In these embodiments, there is no need to determine which centre point is closest to the sample.

The samples are also tested against a magnetic tamper condition to detect if a tamper has occurred. In other embodiments, the samples are tested against a number of different magnetic tamper conditions.

As described in further detail in the following, the present device allows detection of a tamper state in which the measured magnetic field is increased by the tamper magnet. The present device may allow differentiation between tamper state and open non-tamper state when the measured magnetic field is decreased by the tamper magnet. By providing a device that can operate in different power modes and switch between them, battery life may be improved.

Once a new measurement is classified as open or closed, a new representative value for that state and the region boundaries is re-calculated. The system is therefore capable of dynamically responding to changes in the physical environment or for example, other changes to the magnet over time.

It will be understood that the access point may be open to different degrees and a partially open access point may be characterised as being in an open state.

FIG. 1 is a schematic depiction of a sensor system 100 in accordance with an embodiment. The sensor system 100 has a device 102, described in further detail with reference to FIG. 2. The sensor system 100 is shown installed at an access point 104.

The access point 104 has a first component 106 and a second component 108, which are physically separable from each other to create an opening. The opening may provide access to a premises or part thereof. When the first component 106 and second component 108 are physically separated, an opening is produced. The opening provides an entrance and an exit from a space, for example, a room or a building. In the present embodiment, the first component 106 is a doorframe and the second component 108 is a door sized to fit the doorway. In the present embodiment, the door is configured to slide along the x-direction.

As described with reference to FIG. 2, the device 102 has a sensor 202 for sensing a magnetic field from the magnet 110. The sensor system 100 has, in addition to device 102, a magnet 110. In the present embodiment, the magnet 110 is provided on the first component 106 (the doorway) and the device 102 is provided on the second component (the door). However, it will be understood that the magnet 110 can be installed on the second component 108 and the device 102 installed on the first component 106. In some embodiments, the sensor system 100 communicates with control hub 114. The control hub may also be referred to as the control panel.

FIG. 1 shows a reference co-ordinate system 112. In this embodiment, the reference co-ordinate system 112 is a Cartesian co-ordinate system with x, y and z-axes.

In the present embodiment, the access point 104 is a door, in particular a slide door, however, it will be understood that in other embodiments, the door could be a swing door, or any other kind of door, or any kind of window—slide, swing or otherwise. In the present embodiment, the second component 108 moves along a single linear axis (parallel to the x-axis of co-ordinate system 112). It will be understood that, in other embodiments, operation of the access point 104 may involve other directions of movement of the second component 108 and/or the first component 106. For examples, the first component 106 may be attached to the second component 108 by a hinge such that the first component 106 can be considered as rotating away, from an initial position, in the x-y plane. The first component 106 rotates in a plane having a normal that is perpendicular to the z-axis of the co-ordinate system 112. It will be understood that other access point configurations with other opening paths may be possible. For example, some access points configured to be opened by moving either one or both of the first or second components.

Figure 2:
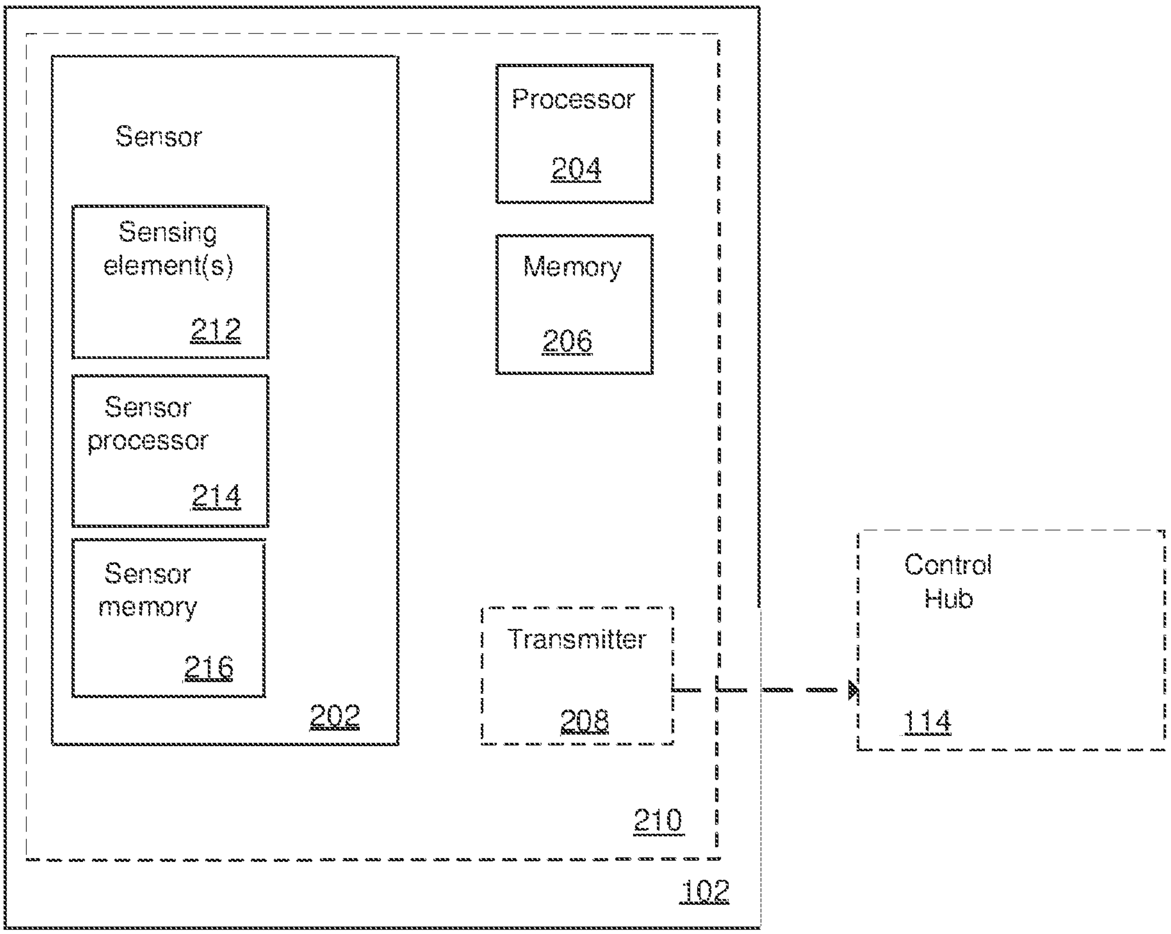
FIG. 2 is a schematic diagram of the device for determining a state of an access point.

Device 102, in accordance with an embodiment, is depicted schematically in the block diagram of FIG. 2. Device 102 has a sensor 202, a processor 204 and a memory 206. In some embodiments, the device 102 also has a transmitter 208 for transmitting one or more signals to control hub 114. In the present embodiment, the sensor 202 is configured to sense a magnetic field, in particular, a magnetic field in three dimensions. In the present embodiment, these correspond to the three dimensions of the orthogonal axes (x, y, z) of co-ordinate system 112. Device 102 also has a housing 210 with an adhesive for mounting the housing 210 to one of the components of the access point 104, in the present embodiment, to the second component 108. The sensor 202, processor 204 and memory 206 are provided inside the housing 210. In embodiments in which the device 102 has a transmitter 208, the transmitter 208 is also provided inside the housing 210. The device 102 is also powered by a battery (not shown) held within the housing 210 of the device 102. The transmitter 208 may also be referred to a transmitting component.

Processor 204 of device 102 is configured to send and receive one or more signals to other components of device 102. For example, the processor 204 is configured to receive sensor output from sensor 202. The processor 204 is also configured to request and receive stored data from memory 206. In some embodiments, the processor 204 communicates with transmitter 208 to operate the transmitter 208 to perform transmission of one or more signals.

The sensor 202 has sensing element(s) 212 for sensing the magnetic field, which produces a response proportional to the strength, magnitude or intensity of the magnetic field. In the present embodiment, the sensor 202 has three sensing elements 212: a first sensing element for sensing the magnetic field in the x direction, a second sensing element for sensing the magnetic field in the y-direction and a third sensing element for sensing the magnetic field in the z-direction, wherein the x, y and z directions correspond to the co-ordinate system 112. Sensor 202 has sensor processing circuitry associated with the sensing elements 212. The sensor processing circuitry may be referred to as a sensor processor 214. The sensor 202 also has associated memory circuitry, also referred to as sensor memory 216. The sensor memory 216 is configured to store values for a set of state parameters. In particular, as described in the following, the sensor memory 216 is configured to store at least state threshold values corresponding to the most recently determined state of the access point 104.

In the present embodiment sensor memory 216 is writable directly by processor 204. In particular, processor 204 is configured to determine at least the state threshold values and any other parameters to be stored on sensor memory 216 and write these values directly to sensor memory 216. In the present embodiment, sensor processor 214 is configured to read values from sensor memory 216 only.

As described in further detail with reference to FIG. 8, the sensor processor 214 is configured to retrieve the state threshold values from sensor memory 216 and compare the outputs from the sensing elements 212 to these values.

The sensor 202 is in communication with processor 204. As described in further detail with reference to FIG. 8, the sensor processor 214 is configured to provide sensor output to the processor 204 and, in some embodiments, one or more signals that carry or represent instructions for the processor 204, for example, a wake-up signal, an indication of a potential change of state, or a sensed magnetic field that is an indication of a potential change of state. In some embodiments, an indication of a potential change of state, or a sensed magnetic field that is an indication of a potential change of state could act as a wake-up signal. Sensor 202 is configured to produce sensor output in response to sensing a magnetic field. The sensor output is provided to the processor 204 and the processor 204 is configured to receive said sensor output and produce a three-dimensional representation of the sensed magnetic field. In some embodiments, the sensor output is representative of a change of state, as opposed to a potential change of state.

Device 102 is configured to be in a plurality of power configurations. In accordance with an embodiment, the device 102 is configured to be in a first, lower power configuration/mode, in which the processor 204 is substantially powered down and the sensor 202 is operating in a lower power mode i.e. collecting samples at a low sampling rate. The device 102 is further configured to be moved to a second, higher power configuration, in which the processor 204 is powered on and the sensor 202 is operating in a higher power mode, which may also be referred to an active mode i.e. collecting samples at a high sampling rate. The sensor 202 is configured to turn the processor 204 on or at least move the processor 204 from a lower power mode to a higher power mode, e.g. by waking the processor 204. Likewise, the processor 204 is configured to move the sensor 202 between power states.

At the low sampling rate there is a first time interval between subsequent samples and at the high sampling rate there is a second, shorter, time interval between subsequent samples. Therefore, the first sample sampled at the high sampling rate will be received more quickly than if the sensor 202 continues to sample at the low sampling rate.

The device 102 is also configured to be placeable into a calibration mode to perform a calibration process.

The sensor 202 is in a lower power mode for most of the time. The sensor 202 may also move to a higher power mode. When in the higher power mode, the sampling rate of the sensor 202 increases. In the higher power mode, the processor 204 performs a state estimate process to classify the sample as one of an open, closed or tamper state.

In some embodiments, the processor 204 is further configured to perform a state classification process on the sample representation. The state classification process may be described, in general terms with reference to FIG. 3 and with further detail with reference to FIG. 8.

Turning back to FIG. 1, the magnet 110 emits a magnetic field. In the present embodiment, the magnet 110 is a bar magnet with north and south poles. The sensor 202 of device 102 senses the magnetic field (or an absence thereof) from the magnet 110, when the access point is a number of different configurations.

By sensing a magnetic field from the magnet 110, the device 102 is configured to detect if the access point 104 is open or closed. A potential intruder may attempt to tamper with the system 100 to avoid detection by placing a tamper magnet about the device 102. For example, the intruder may place the tamper magnet in a similar position relative to the device 102 as that occupied by the magnet 110 when the access point 104 is closed. By providing a tamper magnet, the intruder intends to escape detection by emulating the value of the magnetic field sensed by the sensor 202 when the access point 104 is closed while opening the access point 104. In some embodiments, emulating the closed magnetic field comprises maintaining the sensed magnetic field above a threshold value or in a predetermined range.

Device 102 described with reference to FIG. 1 and FIG. 2, has a sensor 202, a processor 204 and a memory 206. It will be understood that, while the sensor 202 of FIG. 2 is depicted and described as having its own processing circuitry, sensor processor 214, for comparing sensed magnetic fields to state threshold values, in other embodiments, sensor output representative of the sensed magnetic fields or the magnitude/intensity is provided directly to processor 204 for processing.

In any case, processing circuitry of device 102 is represented in the above-described embodiment as processor 204 and sensor processor 214. Processing circuitry may be comprised of one or more processing chips. The processing circuitry may include one or more processing devices, such as microprocessors, microcontrollers, ASIC chips, control circuitry, programmable logic controllers (PLCs), field programmable gate arrays (FPGAs), etc. As a particular example, the processing circuitry may comprise first processing circuitry and second processing circuitry, the first processing circuitry provided as part of a sensor.

The device 102 also has one or more memory resources, represented in FIG. 2 as memory 206 and sensor memory 216. The memory resource may be integrated into the above-described processing circuitry and/or may be comprise a memory device that is separate from the processing device(s). The memory 206 may comprise one or more machine-readable storage devices, which store code for operating the processing component 204. For example, the memory 206 may include a system memory (e.g. a ROM for a Bios), volatile memory (e.g. a random access memory such as one or more DRAM modules) and non-volatile memory (e.g. Flash memory or other EEPROM device).

Instructions for programming, or for execution by, the processing circuitry of the device 102 may additionally or alternatively be derived from a portable or remote memory, e.g. a CD or DVD-ROM, a flash drive or a remote server, for example. Code (and/or data) to implement embodiments of the present disclosure may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language, for example. The instructions may comprise software and/or firmware, for example.

The term 'component' in the above context may be one device, a part or one device, or a plurality of devices. In some embodiments, one or more of the components 202, 204, 206 and 208 may be integrated onto a common device, for an example an integrated circuit.

The processor 204 may be or have a Central Processing Unit (CPU) for performing high level control of the operation of the device 102 and for interfacing with the memory 206, sensor 202, optionally transmitter 208. The CPU may, in some embodiments, also receive the raw indication of the sensed magnetic field from the sensing element(s) 212. The processor 204 may instruct the transmitting component 208, which may comprise a transceiver, to transmit data wirelessly to the control hub 114.

The sensor 202 may be a solid-state magnetometer for sensing magnetic field in three dimensions. The magnetometer may be a single device. In some embodiments, a plurality of sensors is provided in place of the sensor 202, where each sensor is configured to sense a magnetic field in a single direction, for example, each of the three orthogonal directions of the co-ordinate system 112. The sensor 202 provides sensor output that is representative of a sensed magnetic field as magnitudes, proportional to magnetic field strength or intensity, in the respective dimensions. The sensor 202 may be more than one separate component or may be integrated into a single chip. The sensor 202 may be a chip including a transducer and be configured to output sensor output when the sensed magnetic field is outside the region of the present state.

Figure 3:
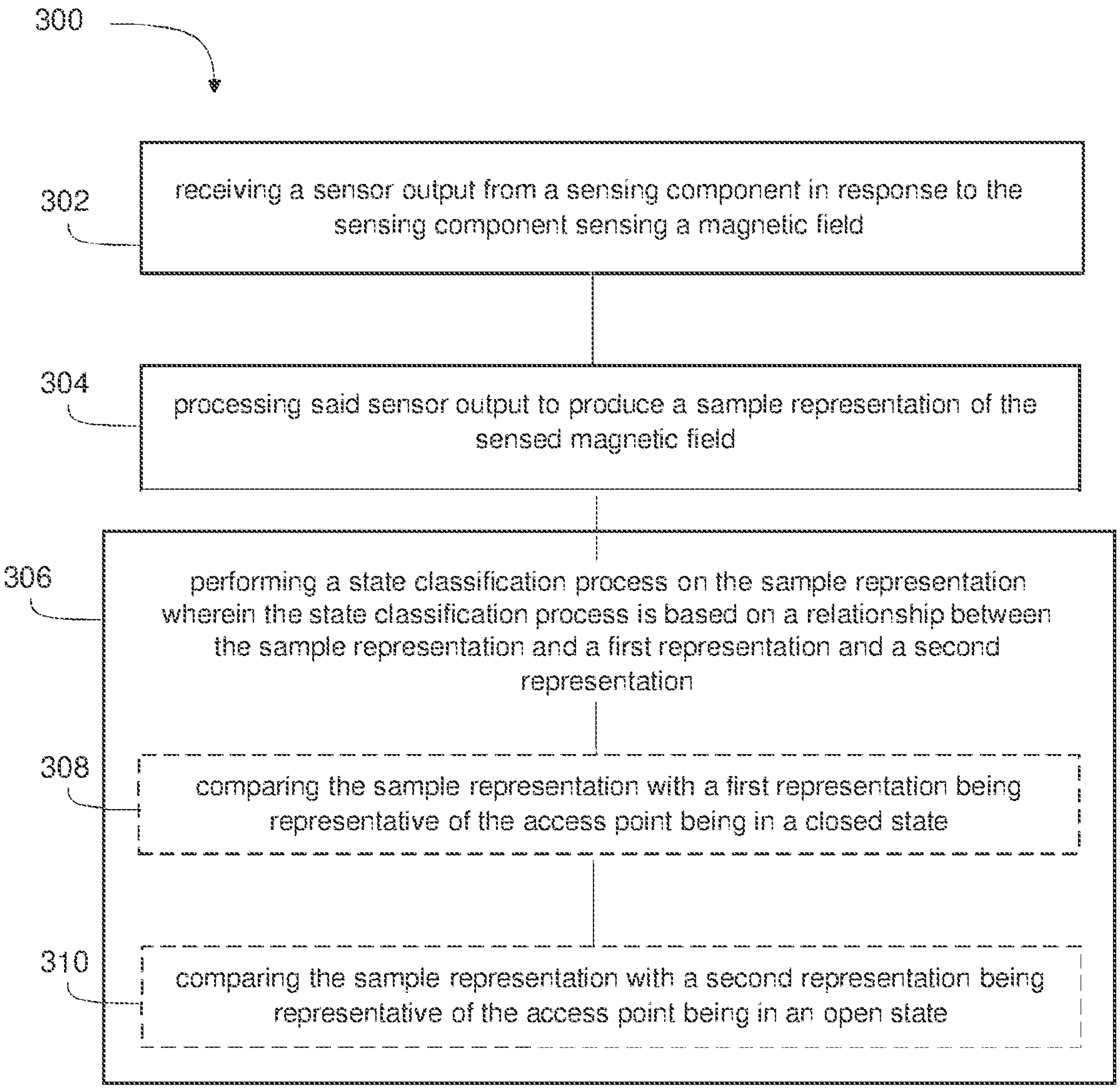
FIG. 3 is a flowchart representing a method of determining a state of an access point, in accordance with an embodiment.

FIG. 3 depicts a flow-chart showing, in overview, a method 300 of determining a state of the access point 104 using device 102. Further detail of the method 300 outlined in FIG. 3, in accordance with an exemplary embodiment, is provided with reference to FIGS. 8 and 9.

At step 302, a sensor output is received from sensor 202, also referred to as a sensing component, in response to the sensor sensing a magnetic field.

At step 304, the sensor output is processed to produce a sample representation of the sensed magnetic field. Examples of sample representations are depicted, for example, in FIG. 7, which has illustrative sample points 712*a*, 712*b*, 712*c*, 712*d*, 712*e*, 712*f* and 712*g*.

At step 306, a state classification process is performed on the sample representation. The state classification is based on a relationship between the sample representation and a first representation that is representative of the access point 104 being in a closed state and a second representation that is representative of the access point being in an open state. By performing the state classification process, it is determined that what state the sample representation is in. The determined state may be selected from a group comprising an open state and closed state and, in some embodiments, a tamper state. The tamper state may be agnostic to whether the access point is open or closed. The first and second representations may be reference vectors and/or their associated regions.

In some embodiments, the state classification process 306 comprises, at step 308, comparing the sample representation with the first representation being representative of the access point 104 being in a closed state and, at step 310, comparing the sample representation with a second representation being representative of the access point 104 being in an open state.

It will be understood that in some embodiments, a single processor, e.g. processor 204, performs the method steps of FIG. 3. In other embodiments, more than one processor performs the method steps of FIG. 3.

Figure 7:
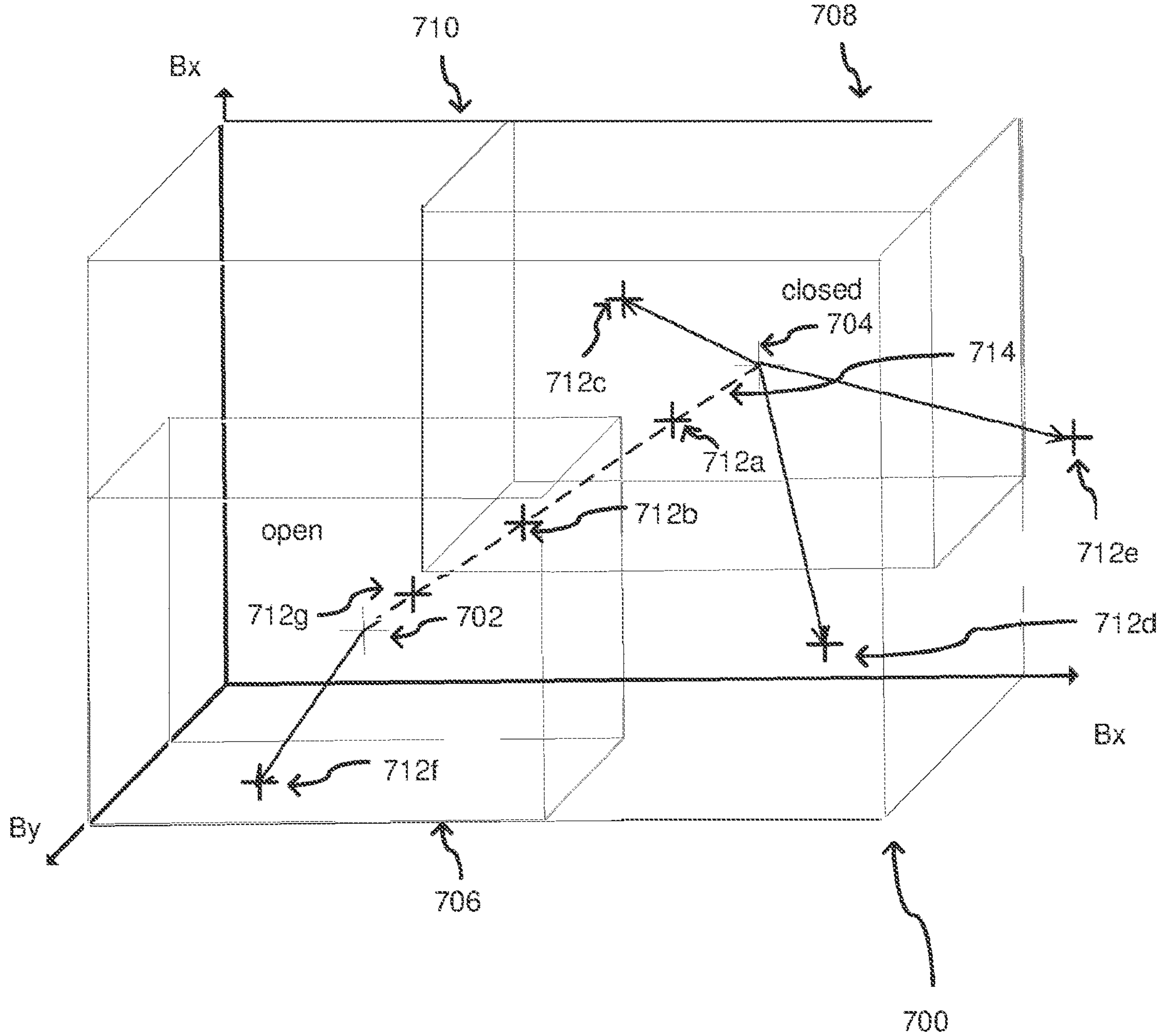
FIG. 7 is a three-dimensional plot in magnetic field strength space illustrating regions and illustrative sample points.

In the present embodiment, the representation of the magnetic field is a three dimensional representation of the magnetic field, for example, the illustrative sample points 712*a*, 712*b*, 712*c*, 712*d*, 712*e*, 712*f* and 712*g* shown in FIG. 7. In the present embodiment, the three dimensional representation is a sensed vector having a first component in the x-direction, a second component in the y-direction and a third component in the z-direction. Each of the x, y, z components of the sensed vector has a value corresponding to the magnitude of the sensed magnetic field in that direction.

Figure 4:
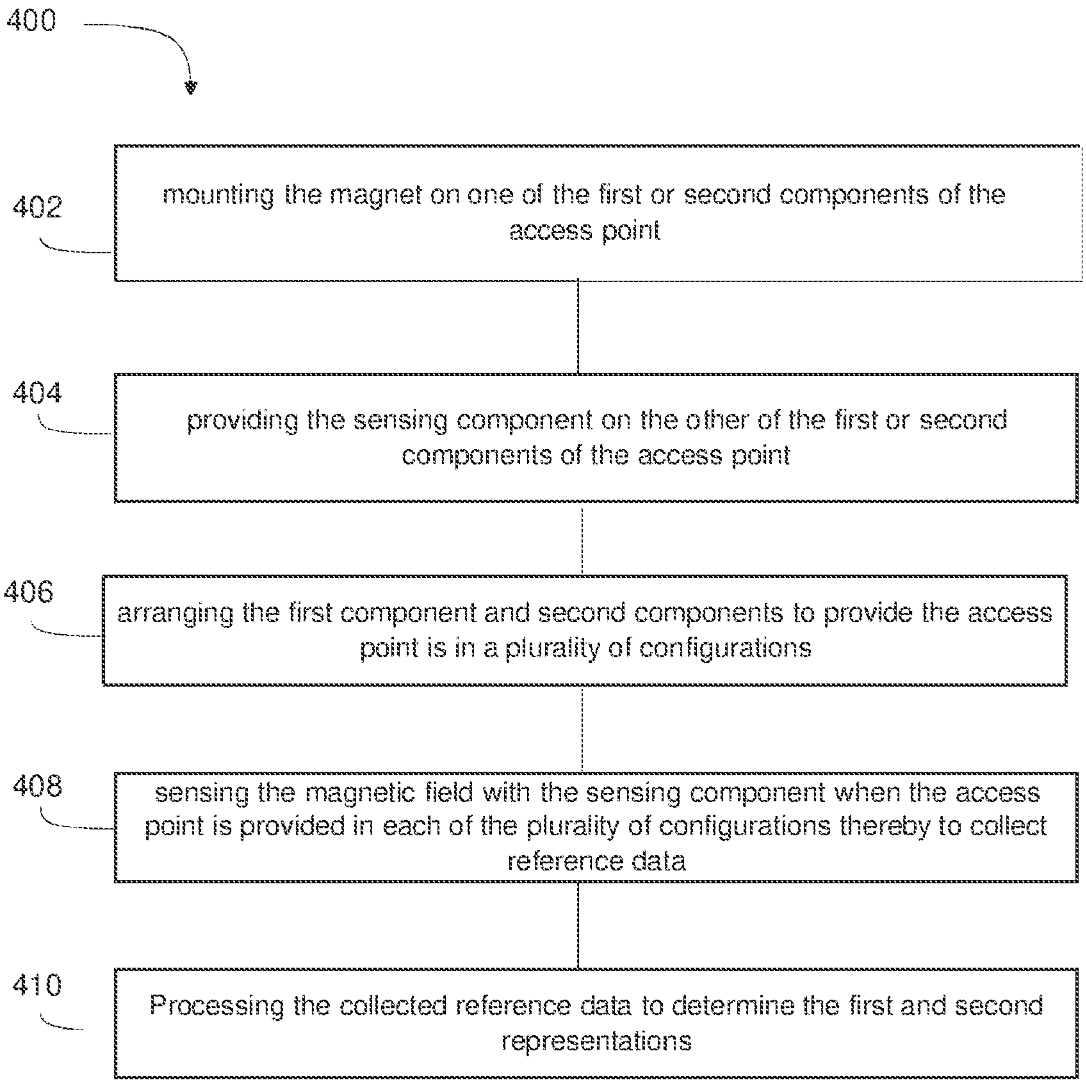
FIG. 4 is a flowchart representing a method of calibrating a device, in accordance with an embodiment.

FIG. 4 is a flow-chart outlining, in overview, a method 400 of calibration of the sensor system 100, in accordance with embodiments. Further description of the method of calibrating the sensor system 100, in accordance with an exemplary embodiment, is provided with reference to FIGS. 8 and 9.

At step 402, the method 400 involves mounting the magnet 110 on either the first component 106 or the second component 108 of the access point 104.

At step 404, the sensor 202, which may also be referred to as a sensing component is provided, by mounting or otherwise, on the other of the first or second components of the access point 104. If the magnet 110 is mounted on the first component 106 of the access point 104 then the sensor 202 is mounted on the second component 108 of the access point 104, and vice versa.

At step 406, the first and second components are arranged to provide the access point 104 in a plurality of configurations.

At step 408, the magnetic field is sensed with sensor 202 when the access point 104 is in the plurality of configuration to collect reference data.

At step 410, the collected reference data is processed to determine the first and second representations. The first and second reference representations are calculated from the collected reference data.

It will be understood that in some embodiments, one or more processors performs a number of method steps of FIG. 4, in particular, steps 408 and 410.

Figure 5:
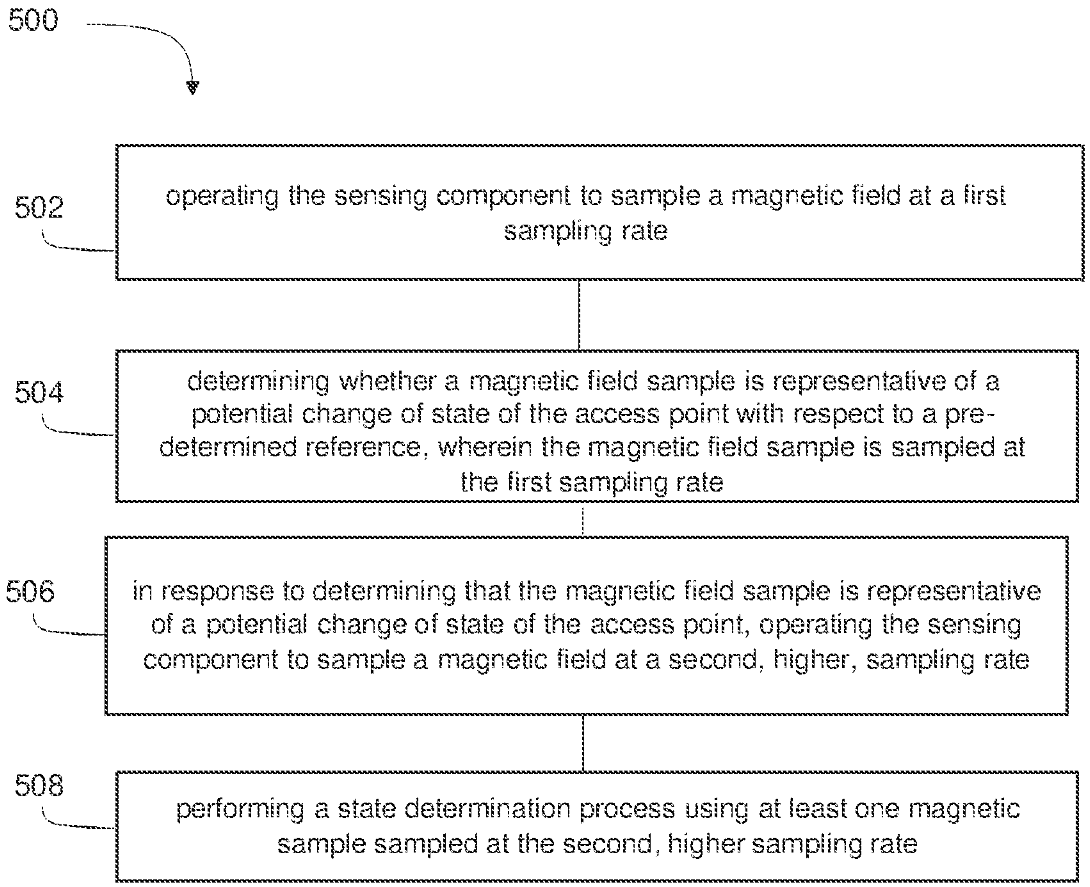
FIG. 5 is a flowchart representing a method of operating a device for determining a state of an access point, in accordance with an embodiment.

FIG. 5 is a flow-chart outlining, in overview, a method 500 of operation of the sensor system 100, in accordance with embodiments. Further description of the method outlined in Figure in accordance with an exemplary embodiment, is provided with reference to FIGS. 8 and 9.

At step 502, the sensor 202, also referred to as a sensing component, and is instructed to sample a magnetic field at a first sampling rate.

At step 504, it is determined whether the magnetic field sample is representative of a potential change of state of the access point 104 with respect to a pre-determined reference. The magnetic field sample is sampled at the first sampling rate.

At step 506, in response to determining that the magnetic field sample is representative of a change of state of the access point 104, the sensor 202 is operated to sample a magnetic field at a second, higher, sampling rate thereby to produce a plurality of magnetic samples.

At step 508, a state determination process is performed using said plurality of magnetic samples sampled at the second, higher sampling rate. The state determination process may be in accordance with method 300, in some embodiments.

It will be understood that in some embodiments, a single processor performs method steps of FIG. 5. It will be further understood that in other embodiments, more than one processor performs method steps of FIG. 5. In particular, as described with reference to FIG. 5, steps 502, 504 and 506 are performed by processor 204 and sensor processor 214 performs step 508.

Figure 6:
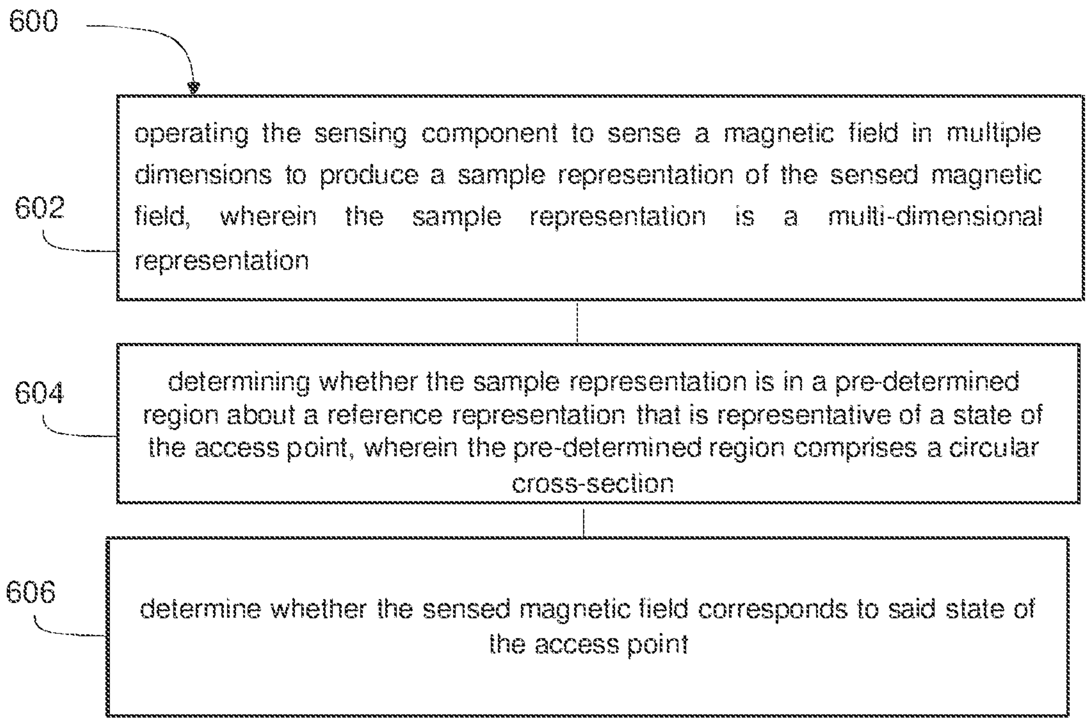
FIG. 6 is a flowchart representing a method of determining a state of an access point, in accordance with an embodiment.

FIG. 6 is a flow-chart outlining, in overview, a method 600 of operation of the sensor system 100, in accordance with further embodiments.

At step 602, the sensor 202 is operated to sense a magnetic field in multiple dimensions to produce a sample representation of the sensed magnetic field, wherein the sample representation is a multi-dimensional representation (as is also the case in processes 300, 400 and 500).

At step 604, it is determined whether the sample representation is in a pre-determined region about a reference representation that is representative of a state of the access point 104. The pre-determined region has a circular cross-section. This step may be the same as, or substantially the same, as step 504.

At step 606, it is determined whether the sensed magnetic field corresponds to said state of the access point 104. At step 606 the determination whether the sensed magnetic field corresponds to said state of the access point 104 is based on whether the sample representation is in the pre-determined region as determined at step 604. For example, it may be determined that if the sample representation is in said predetermined region then it is determined that the access point is in said state.

In some embodiments said pre-determined region is about a reference representation that is representative of a closed state, and if it is determined that the sample is not in said region then it is determined that the access point is not in a closed state or not in a closed non-tamper state. For example, it may be determined that the access point is either in an open state or a tamper state.

In other embodiments, if it is determined that the sample is not in said region, then a determination of the state of the access point may be made in accordance with method 300, for example by performing the steps in accordance with steps 306-310.

It will be understood that in some embodiments, some or all of the method steps of FIG. 6 are performed by a single processor. For example, it will be understood that, in some embodiments, sensor processor 214 may in some embodiments perform all of the method steps of FIG. 6. The method steps of FIG. 6 may correspond to the steps performed by sensor processor 214 as part of the change of state determination process. In some other embodiments step 602 may be performed by sensor processor 214, step 206 may be performed by processor 204 and step 204 may be performed by sensor processor 214 in some embodiments and processor 204 in other embodiments.

FIG. 7 is an illustration of a three-dimensional plot 700. The three-dimensional plot 700 is produced in a co-ordinate system that has axes corresponding to the co-ordinate system 112 of FIG. 1. In particular, the three dimensional plot has a first axis corresponding to the magnetic field strength (Bx) sensed in the x-direction, a second axis corresponding to the magnetic field strength (By) sensed in the y-direction and a third axis corresponding to the magnetic field strength (Bz) sensed in the z-direction.

FIG. 7 shows a first reference point 702. FIG. 7 illustrates a number of data points. Although these are represented as points on the three-dimensional plot, it will be understood that each point has corresponds to a measurement of three values of magnetic field strength corresponding to the x, y and z direction, respectively. Accordingly, the reference point may be represented as a vector or array with three components, or as a point in three-dimensional space. First reference point 702 may therefore be represented as a first reference vector. Likewise, FIG. 7 shows a second reference point 704, which may be represented as a second reference vector.

FIG. 7 has a first region 706 surrounding the first reference point 702. A second region 708 is also shown that surrounds the second reference point 704. In this embodiment, the first region 706 defines a first three dimensional volume about the first reference point 702 and the second region 708 defines a second three dimensional volume about the second reference point 704. A third region 710 is also defined that contains all of both the first region 706 and the second region 708.

There is a spatial relationship between the first and second reference points and their associated regions. There is a further spatial relationship between the first and second regions and the third region.

The first reference point 702 and its associated region 706 are determined by a statistical process, for example, a statistical or machine learning algorithm, that is performed on reference data collected when the access point 104 is in a plurality of open configurations. Therefore, for brevity, the first reference point 702 and associated region may be referred to as the open reference point 702 and the open region 706, respectively. A statistical process is also performed on reference data collected when the access point 104 is in a plurality of closed configurations to determine the second reference point 704, also referred to as the closed reference point 704, and its associated region, referred to as the closed region 708. As an alternative to a plurality of closed configurations the statistical processes for determining the closed and open references points may be respectively performed for one closed positions and at least one open position, based on multiple samples captured for each of the respective closed position and open position(s). The third region 710 is defined based on the first and second regions.

The statistical process may be a machine learning process. The reference data used by the machine learning process is collected during a reference data collection process, and the determination of the open reference point 702 and the closed reference point 704 and the first, second and third regions are performed during a subsequent reference data analysis process. The reference data collection process and analysis, in accordance with an exemplary embodiment, are described in further detail with reference to FIG. 8.

The algorithm, in accordance with an embodiment, assumes a model characterized by model parameters, in which the magnetic field samples in three dimensions are generated from multivariate normal distribution with state (i.e. open and closed states) and installation dependent parameters. The model parameters are estimated during a calibration process performed during the installation process.

FIG. 7 also illustrates a transition path 714 between the open reference point 702 and the closed reference point 704. The transition path 714 is typically linear in the case of a sliding access point (for example, a slide door/window) and is representative of an expected transition path for the access point 104. It has been found that the transition path may be curved in the case of a hinged access point. However, for some hinged access points, it has also been found that the magnetic field strength contributed by the magnet will typically die away before significant curvature in the path occurs and so the transition path therefore may still be substantially linear for hinged applications. A linear approximation of a curved transition is sufficient in some embodiments.

FIG. 7 shows illustrative sample points **712*a*, 712*b*, 712*c*, 712*d*, 712*e*, 712*f* and 712*g*. These illustrative sample points may illustrate sensed magnetic samples, for example, to be compared to state threshold values by sensor processor 214 or three-dimensional representations of the sensed magnetic samples to be processed and classified by processor 204**.

Figure 8:
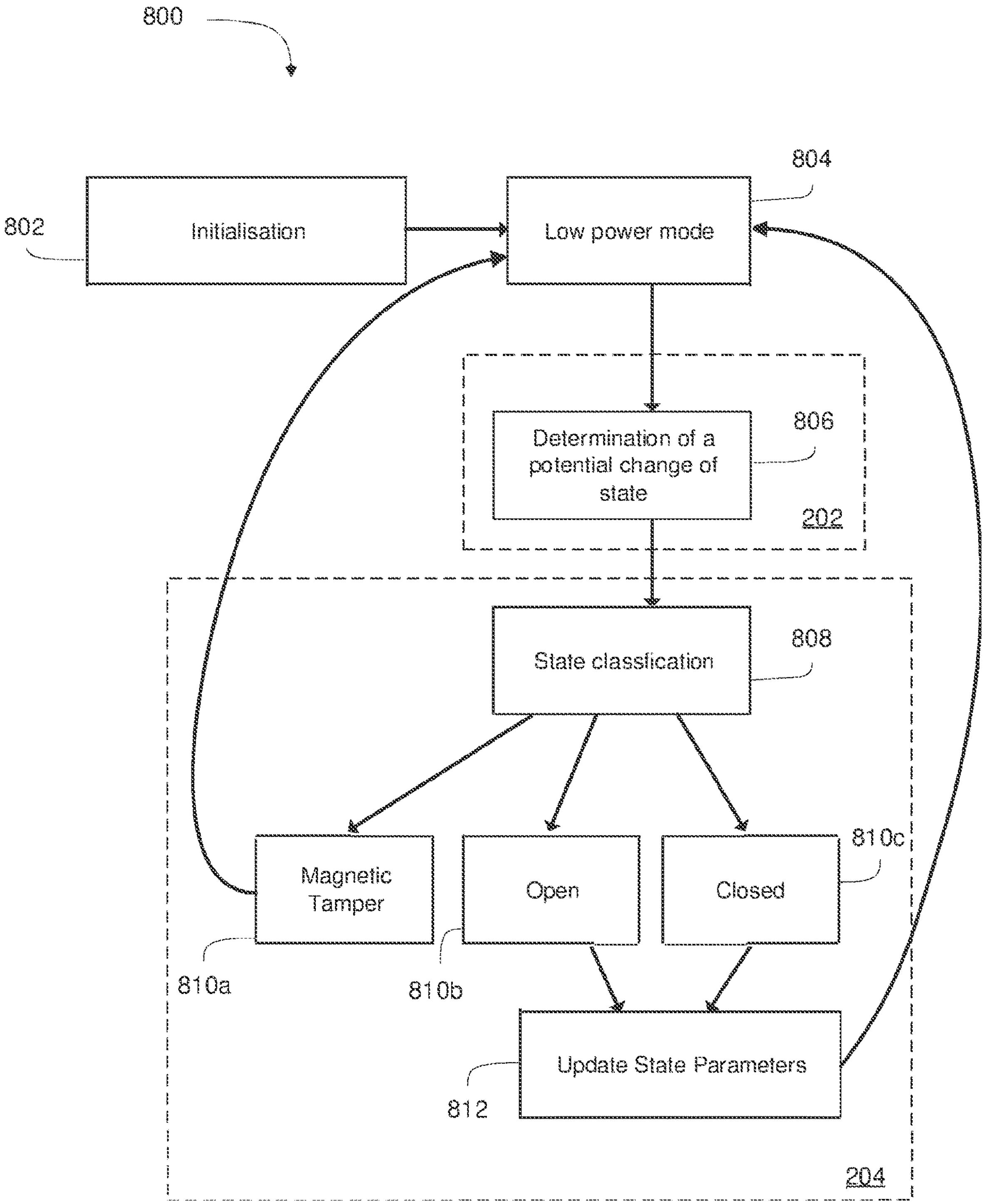
FIG. 8 is a flowchart representing a method of determining a state of an access point using the sensing device, in accordance with an exemplary embodiment.

Further discussion on the illustrative sample points **712*a*, 712*b*, 712*c*, 712*d*, 712*e*, 712*f* and 712*g* is provided with reference to FIG. 8. In general, the first and second representations are initialized by a calibration process. The calibration process, in accordance with an exemplary embodiment, is also described in in further detail with reference to FIGS. 8 and 9**.

FIG. 8 shows a flowchart of a method of operating the device 102, in accordance with an exemplary embodiment. FIG. 8 depicts method steps performed by sensor 202 and by processor 204.

Figure 9:
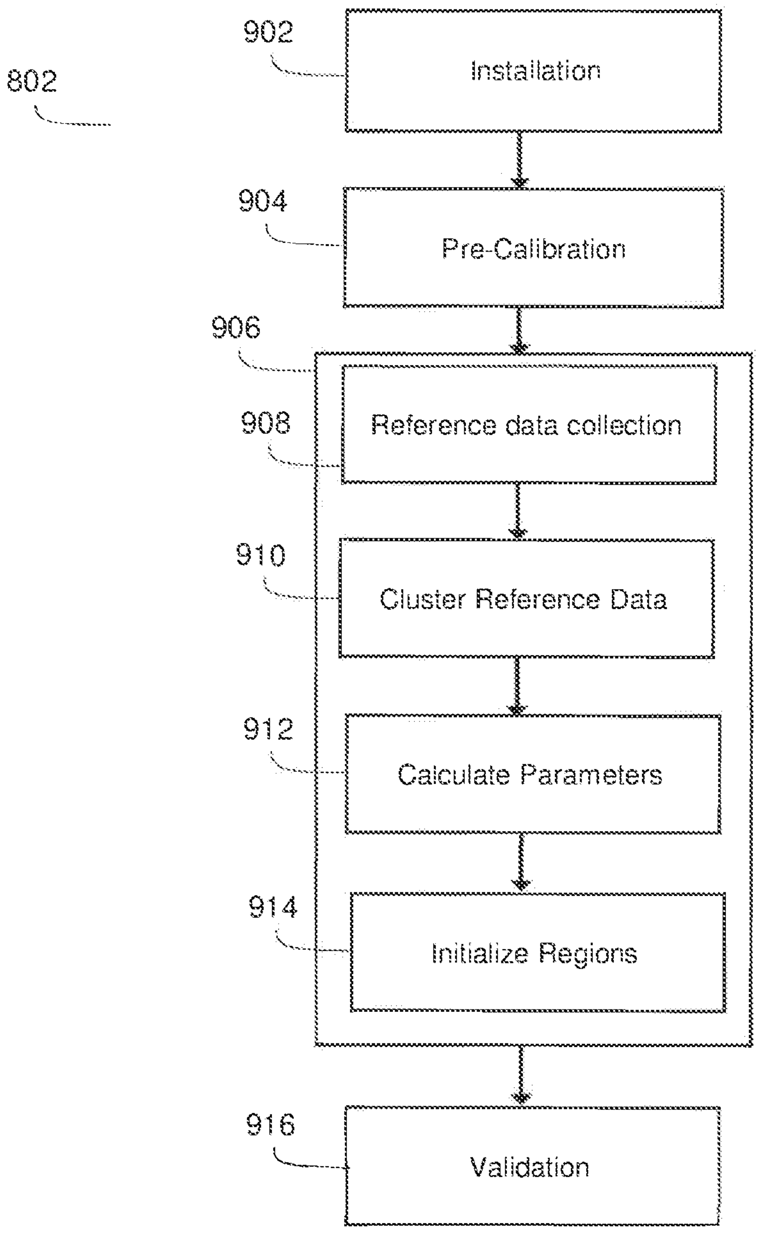
FIG. 9 is a flowchart representing a method of calibrating the device, in accordance with an exemplary embodiment.

An initialization process is performed at step 802. FIG. 9 shows a flowchart of the initialization process of step 802, in accordance with an exemplary embodiment.

Initialization

As described with reference to FIG. 9, the initialization process includes installation, calibration and calibration validation steps. As part of the initialization process, initial values for model parameters for the state classification algorithm are determined.

Installation

The installation process at step 902 includes physically installing the device 102 and magnet 110 at the access point 104. As described with reference to the example of FIG. 2, the installation process includes mounting the magnet 110 on the first component 106 (the doorway) and mounting the device 102 on the second component (the door).

Pre-Calibration Process

At step 904, an optional pre-calibration process is performed. The pre-calibration process includes waiting for the device 102 to be in a steady (static and stable) condition, with the access point closed, following installation. During the pre-calibration phase, the sensor 202 collects magnetic field samples at a sampling rate of, for example, 10 Hz. To validate the operation of the device 102 in a steady condition, two criteria must be met during a first moving window of, for example, three seconds, inside a larger window of, for example, 18 seconds. The validation process is performed by processor 204 based on sensor output provided by sensor 202.

The first criteria to be satisfied is that the collected magnetic field samples correspond to an average magnetic field magnitude larger than a lower threshold. In the present embodiment, the lower threshold is 1 milli-Tesla. However, it will be understood that other suitable values may be used.

The second criteria to be satisfied is that the variance of the magnitude of the collected magnetic field samples is less than a variance threshold. In the present embodiment, the variance threshold is 50 micro-Tesla squared. However, it will be understood that other suitable values may be used.

Calibration Process

Following the pre-calibration step, a calibration process is performed, as depicted at step 906 of FIG. 9 to identify magnetic conditions representative of the access point being in the closed state and the open state, respectively. It will be understood that details of the calibration process will vary between embodiments, and will be dependent on a number of factors, for example, installation location. However, we provide the following description of the calibration process in accordance with the present embodiment.

Reference Data Collection

As shown in FIG. 9, the calibration process 906 includes a reference data collection step 908, a cluster reference data step 910, a parameter calculation step 912 and an initialize region step 914.

To perform the calibration process the device 102 is placed into a calibration mode. In the calibration mode, the sensor 202 is configured to sense magnetic field samples at a calibration-sampling rate. In the calibration mode, the processor 204 is configured to receive sensor output and process the sensor output.

Figure 10:
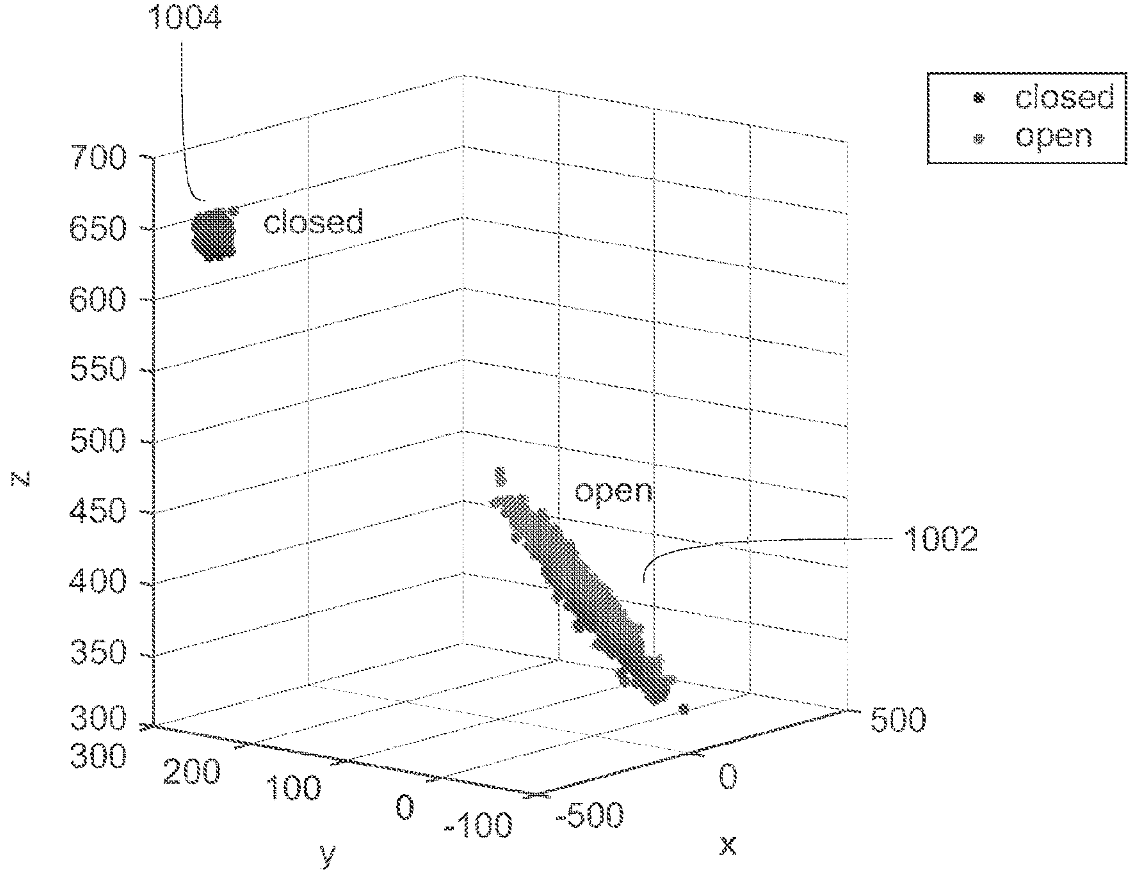
FIG. 10 is a three-dimensional plot illustrating reference data points representative of magnetic field samples.

FIG. 10 shows a plot of collected reference data collected during the calibration process 906.

FIG. 10 is produced in a co-ordinate system that has axes corresponding to the co-ordinate system 112 of FIG. 1. In particular, the three dimensional plot has a first axis corresponding to the magnetic field strength (Bx) sensed in the x-direction, a second axis corresponding to the magnetic field strength (By) sensed in the y-direction and a third axis corresponding to the magnetic field strength (Bz) sensed in the z-direction.

To collect reference data, the processor 204 instructs the sensor 202 to operate at a calibration sample rate over a calibration time period. In the present embodiment, the calibration sample rate is 10 Hz and the calibration time period is 10 s. However, it will be understood that other calibration sample rates may be used.

During the calibration process, the operator of the system 100, for example, the installer of the system 100, is instructed to open and close the second component 108 of the access point 104, preferably repeatedly, thereby to move the access point 104 into closed and open configurations, so that the collected reference data is representative of the access point 104 being in a closed and open configuration.

Regarding relative timings, the access point 104 is to be held in an open and closed configuration for at least 30% of the reference data collection time.

Over the calibration time period a plurality of magnetic field samples are collected by the sensor 202. For each collected sample, the magnetic field is sensed in three dimensions and therefore three values of magnetic field are sensed, each value corresponding to a spatial dimension along x, y and z. Each sample may be represented as a magnetic field vector with three entries: $(B_x, B_y, B_z)$.

During the calibration process, the sensor 202 transmits sensor output to the processor 204. The processor 204 records representations of the sensed samples as reference data. The reference data representative of the measured magnetic field samples are stored in memory 206 of device 102.

In the present embodiment, the reference data representative of the measured magnetic field samples collected during the calibration time period are collected into a calibration data matrix. The calibration matrix is labelled CalibDataMat. The calibration matrix is a matrix with entries corresponding to magnetic field strengths in the x, y and z directions.

In the present embodiment, the calibration data matrix is a two-dimensional matrix. If N is the number of samples collected and stored over the calibration time period, then it will be understood that the calibration data matrix has a first dimension of size N and a second dimension of the number of spatial dimensions. In the present embodiment, the calibration data matrix is an N×3 matrix. In the present embodiment, as the calibration time period is 10 seconds and the sample rate is 10 Hz, the number of samples, N, is 100 and the calibration data matrix is a 100×3 matrix.

It will be understood that the reference data can be stored in different data structures. For example, the calibration matrix could also be considered an N-dimensional vector as a vector of the measured magnetic field for all the samples collected over the calibration time period.

Following the calibration time period, a N×1 dimensional vector is computed, referred to as the energy calibration vector and labelled EnergyCalibVec. Each entry of the vector is representative of the sum of squares of the measured magnetic field vector for the sample. For example, the first element in the energy calibration vector for a sample that is represented by a magnetic field vector $(B_x, B_y, B_z)$ is equal to $B_x^2+B_y^2+B_z^2$. Each entry of the energy calibration energy vector may also be calculated as the inner or dot product of the magnetic field vector of the sample. Together with the calibration data matrix, the energy calibration vector is stored in memory 206.

Clustering of Reference Data

Following the reference data collection at step 908, the processor 204 processes the reference data to perform a reference data analysis. In the present embodiment, the analysis includes using a machine-learning algorithm. In the present embodiment, the analysis include step 910 which is a clustering step in which the reference data of the calibration data matrix is clustered into two groups. In the present embodiment, the clustering step uses the K-means clustering algorithm. For each sample, the algorithm takes the corresponding entry of the calibration data matrix (the magnetic field vector for that sample) and associates the sample with one of the two groups. Each group can be represented in three dimensions. The algorithm also determines a geometrical center of each group.

After dividing the samples into two groups, a first group is labelled as the open group and the second group is labelled as the closed group. In the present embodiment, the labelling of groups is determined by computing an indication of the average energy of the group using values of the stored energy calibration vector. In the present embodiment, the indication of the average energy of the group is computed using the formula:

$$\text{Group Energy} = \frac{1}{N_G}\sum\nolimits_{i=1}^{N_G} B_{i,X}^2 + B_{i,y}^2 + B_{i,z}^2,$$

where the group has $N_G$ samples and the sum is over the samples of the group. It will be understood that the $i^{th}$ member of each group has a magnetic field represented by magnetic field vector ($B_{i,X}$, $B_{i,Y}$, $B_{i,Z}$). A first indication of average energy of the group is computed for the closed group and a second indication of average energy is computed for the open group. The first indication of average energy and the second indication of average energy values are compared. The group with the larger value of calculated indication of average energy is labelled as the closed group. The group with the smaller value of calculated group energy is labelled as the open group. It will be understood that, in general, a closed door or access point will have larger values of measured magnetic field as the magnet 110 is closest to the sensor 202 when the access point is in the closed configuration.

A representation of the two groups is stored in memory 206. It will be understood that in some embodiments, these may be represented as two separate matrices, for example, the reference data for the open group are stored in a matrix referred to as the open door data matrix (OpenDoorDataMat) and the reference data for the closed group are stored in a matrix referred to as the closed door matrix (CloseDoorDataMat).

For the purposes of the following description, the open door matrix and closed-door matrix will be used, however, it will be understood that other data structures may be used. For example, any data structure that stores the information relating to which samples belong to which group may be used. For example, in some embodiments, only two sets of indices are stored: a first set indicating which samples belong to the open group and a second set indicating which entries belong to the closed group. The entries of open door matrix and the closed-door matrix may then be retrieved from the stored calibration data matrix. In other embodiments, one or more of the open door data matrix, closed-door matrix and calibration data matrix is a matrix of pointers to a data structure containing the reference data.

Returning to FIG. 10, it is evident that the reference data shown in FIG. 10 forms two groups or clusters: FIG. 10 shows a first plurality of reference data points referred to as open reference data 1002 identified as corresponding to the access point 104 being open. FIG. 10 shows a second plurality of reference data points 1004 identified as closed reference data corresponding to the access point 104 being closed.

It may be observed from FIG. 10 that the open reference data 1002 is dispersed over a larger three-dimensional volume than the closed reference data 1004. This can be understood in that the open reference data 1002 is representative of magnetic field strength sampled in a plurality of open configurations. In other words, the access point 104 can have different degrees of openness, for example on a range between slightly open and fully open. The spread or offset of the open reference data may be in more than one direction. In comparison, the closed reference data 1004 represents measurements of magnetic field when the door is in a closed configuration or is sufficiently close to being in a closed configuration. Therefore, the closed reference data 1004 tends to have a smaller spread.

In statistical terms, the open reference data 1002 forms a first distribution about a first mean point or vector and the closed reference data 1004 forms a second distribution about a second mean point or vector. The first distribution of the open reference data 1002 can be considered to have a larger value of variance (or standard deviation) than the second distribution of the closed reference data 1004.

Model Parameter Calculation

Following the initial clustering stage, values for a number of data structures and parameter values are determined. This is represented at the calculate parameters step 912 of FIG. 9. The parameters that are calculated are described in the following.

As described above, for each of the open and closed group, a mean vector is determined. The mean vector represents a geometric center of the group, in three-dimensional magnetic field space.

In the present embodiment, the mean vector for the closed group, herein referred to as the closed mean vector is calculated using the formula:

$$MU_{Closed} \triangleq \mu_c = \frac{1}{N_c} * \sum_{i=1}^{N_c} CloseDoorDataMat(i, :) = (\mu_{cx} \;\; \mu_{cy} \;\; \mu_{cz})^T$$

In the present embodiment, the mean vector for the open group, herein referred to as the open mean vector is calculated using the formula:

$$MU_{Open} \triangleq \mu_o = \frac{1}{N_o} * \sum_{i=1}^{N_o} OpenDoorDataMat(i, :) = (\mu_{ox} \;\; \mu_{oy} \;\; \mu_{oz})^T$$

Using the mean vectors of each group, a distance vector between the mean of the open group and the mean of the closed group is determined. A magnitude of the distance vector is also determined. In the present embodiment, this magnitude is calculated as follows:

$$\text{ClosedToOpenDistance}=\sqrt{(\mu_c-\mu_o)^T*(\mu_c-\mu_o)}$$

Related to this parameter, a further parameter is set at this stage (distMax) which is representative of a maximum distance (in microtesla):

$$distMax = \frac{ClosedToOpenDistance}{2}$$

In the following, although the term mean vector is used, it will be understood that the vector is representative of a true mean of the reference data at the initialization stage. Indeed, this vector will be updated after a state classification process and hence be only an approximation to the mean and an approximation to the center of the region. However, the term mean vector and geometric center point will be used in the following.

In addition, for each group a covariance matrix is calculated. To determine the covariance matrix, a deviation matrix between the data matrix for each data group (open or closed) and the determined mean vectors is calculated. The deviation matrix is representative of the distance between the magnetic field for the sample and the mean vector (central point). Using the values of each deviation matrix, the covariance matrices for each group is determined. For example, the closed covariance matrix is calculated as follows:

$$COV_{Closed} \triangleq \sum_{Closed} = \frac{1}{N_c - 1} * \left([CloseDoorDataMat - MU_{Closed}]^T * [CloseDoorDataMat - MU_{Closed}]\right) = \begin{pmatrix} C_{c11} & C_{c12} & C_{c13} \\ C_{c21} & C_{c22} & C_{c23} \\ C_{c31} & C_{c32} & C_{c33} \end{pmatrix}$$

The open covariance matrix is calculated as follows:

$$COV_{Open} \triangleq \sum_{Open} = \frac{1}{N_o - 1} * \left([OpenDoorDataMat - MU_{Open}]^T * [OpenDoorDataMat - MU_{Open}]\right) = \begin{pmatrix} C_{o11} & C_{o12} & C_{o13} \\ C_{o21} & C_{o22} & C_{o23} \\ C_{o31} & C_{o32} & C_{o33} \end{pmatrix}$$

In addition to calculating values for parameters, a number of other parameters used during the classification process are initialized and assigned values during the calibration process. These include a parameter setting the maximum distance ratio (distRatioMax) which in exemplary embodiments may respectively be equal to 2; 1.5; 1.1 or less, for example 1.05. In the present embodiment this parameter is set to 1.02. A further parameter that is assigned values at this stage include: an initial value for the parameter "last state", which in the present embodiment is set to "closed". This parameter may be updated following the state classification process, described in the following. Further parameters that are assigned include a (also referred to as "alpha_update_coeff" is set to 0.01), and a max distance parameter (distMax) which, for an exemplary measurement of ClosedToOpenDistance of 1.6 mT, has the value 800 microtesla. These parameters and their significance are described in the following.

Defining Regions

Following the initial calculation of parameters at step 912, the processor 204 then uses these parameter values to define open and closed regions in the three-dimensional magnetic field space, at initialize regions step 914.

In the present embodiment, the first and second regions are each cuboids and defined in each spatial dimension by a lower bound value and an upper bound value. Each region is thus defined by a set of six regional parameters corresponding to maximum $B_x$, minimum $B_x$, maximum $B_y$, minimum $B_y$, maximum $B_z$ and minimum $B_z$ thereby defining a volume in three dimensional magnetic field space. Each region has a size in the x-dimension, a size in the y-dimension and a size in the z-dimension. The size in the x-dimension is the difference between the maximum and minimum values for $B_x$. Likewise, the size in the y-dimension is the difference between the maximum and minimum values for $B_y$. Likewise, the size in the z-dimension is the difference between the maximum and minimum values for $B_z$.

In further detail, the following parameters are defined:

$$N_s = 1 + \max(N_{s,i}),\ i = x, y, z,$$

$$N_{s,i} = \frac{|\mu_{ci} - \mu_{oi}|}{\sqrt{C_{cjj}} + \sqrt{C_{ojj}}},\ j = 1, 2, 3 \text{ for } i = x, y, z \text{ respectively}$$

In the present embodiment, the closed region 708 thresholds are defined as follows:

$$\text{High\_}Th\_X_{Closed} = \mu_{cx} + N_s * \sqrt{C_{c11}}$$

$$\text{Low\_}Th\_X_{Closed} = \mu_{cx} - N_s * \sqrt{C_{c11}}$$

$$\text{High\_}Th\_Y_{Closed} = \mu_{cy} + N_s * \sqrt{C_{c22}}$$

$$\text{Low\_}Th\_Y_{Closed} = \mu_{cy} - N_s * \sqrt{C_{c22}}$$

$$\text{High\_}Th\_Z_{Closed} = \mu_{cz} + N_s * \sqrt{C_{c33}}$$

$$\text{Low\_}Th\_Z_{closed} = \mu_{cz} - N_s * \sqrt{C_{c33}}$$

In the present embodiment, the open region 706 thresholds are defined as follows:

$$\text{High\_}Th\_X_{Open} = \mu_{ox} + N_s * \sqrt{C_{o11}}$$

$$\text{Low\_}Th\_X_{Open} = \mu_{ox} - N_s * \sqrt{C_{o11}}$$

$$\text{High\_}Th\_Y_{Open} = \mu_{oy} + N_s * \sqrt{C_{o22}}$$

$$\text{Low\_}Th\_Y_{Open} = \mu_{oy} - N_s * \sqrt{C_{o22}}$$

$$\text{High\_}Th\_Z_{Open} = \mu_{oz} + N_s * \sqrt{C_{o33}}$$

$$\text{Low\_}Th\_Z_{Open} = \mu_{oz} - N_s * \sqrt{C_{o33}}$$

A third region is also defined based on the first and second regions. The third region may be considered as an envelope region and contains the first and second region within its volume. Like the first and second regions, the third region is also defined by a set of six parameters. The third region is defined by the values of: maximum $B_x$, minimum $B_x$, maximum $B_y$, minimum $B_y$, maximum $B_z$ and minimum $B_z$ thereby defining a volume in three dimensional magnetic field space. The value of the maximum $B_x$ is defined as the greater of the values for the corresponding parameters for the first and second regions. Likewise, the value of the minimum $B_x$ is defined as the lesser of the values for the corresponding parameters for the first and second regions. Corresponding definitions apply for the values of maximum $B_y$, minimum $B_y$, maximum $B_z$ and minimum $B_z$. Therefore, the third region is defined to encompass the first and second region.

In the present embodiment, the regional parameters for the third region 710 are defined as follows:

$$\text{High\_}Th\_X_{Tamper} = \max(\text{High\_}Th\_X_{Closed}, \text{High\_}Th\_X_{Open})$$

$$Low\_Th\_X_{Tamper}=\min(Low\_Th\_X_{Closed}, Low\_Th\_X_{Open})$$

$$High\_Th\_Y_{Tamper}=\max(High\_Th\_Y_{Closed}, High\_Th\_Y_{Open})$$

$$Low\_Th\_Y_{Tamper}=\min(Low\_Th\_Y_{Closed}, Low\_Th\_Y_{open})$$

$$High\_Th\_Z_{Tamper}=\max(High\_Th\_Z_{Closed}, High\_Th\_Z_{Open})$$

$$Low\_Th\_Z_{Tamper}=\min(Low\_Th\_Z_{Closed}, Low\_Th\_Z_{Open})$$

While the first and second regions are cuboids in the present embodiment, other shapes for regions may be used in other embodiments. Further details are provided with reference to FIGS. 12 and 13.

Figure 11A:
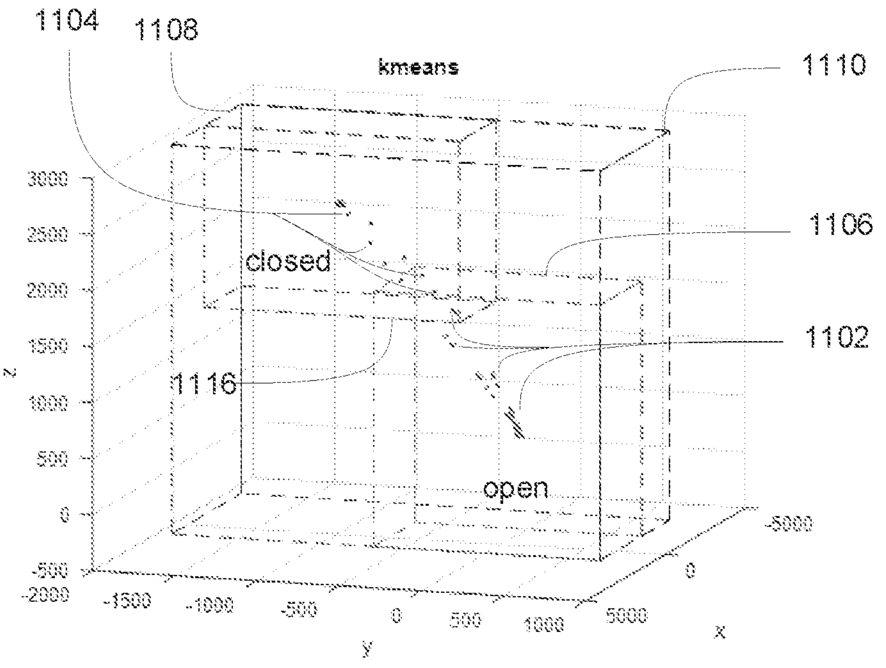
FIG. 11(*a*) is a three-dimensional plot illustrating reference data representative of magnetic field samples and FIG. 11(*b*) is a two-dimensional projection of the plot of FIG. 11(*a*)
Figure 11B:
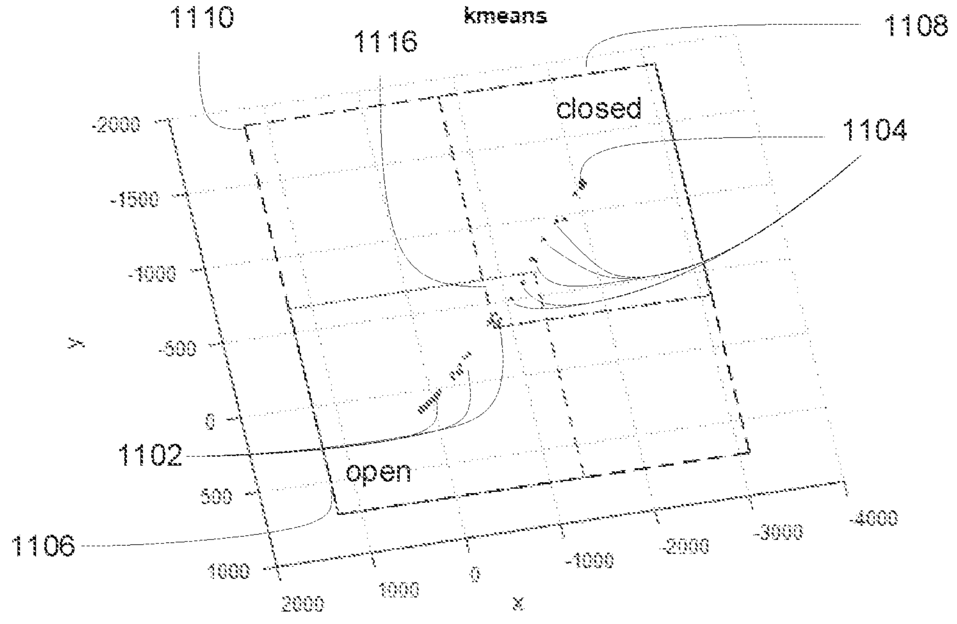

FIG. 11(*a*) and FIG. 11(*b*) illustrate examples of the first (open), second (closed) and third regions in a three-dimensional plot.

FIG. 11(*a*) is a three dimensional plot showing reference data. The axes of the plots of FIGS. 11(*a*) and 11(*b*) are as described with reference to FIG. 7. FIG. 11(*a*) shows first reference data identified as open reference data 1102. FIG. 11(*a*) also shows second reference data identified as closed reference data 1104. FIG. 11(*a*) shows a first region, also referred to the open region 1106. The open region 1106 is defined with reference to the mean vector of the open reference data, as described previously. FIG. 11(*a*) also shows a second region, also referred to as a closed region 1108. The second region is defined with reference to the mean vector of the closed reference data.

FIG. 11(*a*) also shows the third region 1110. The third region is defined as described above. The third region contains all the reference data including open reference data and closed reference data but is defined with reference to the first and second regions.

FIG. 11(*b*) is a 2-dimensional projection of the three dimensional plot of FIG. 11(*a*). FIG. 11(*b*) shows a projection in the x-y plane. FIG. 11(*b*) shows open reference data 1102 and associated region 1106. FIG. 11(*b*) also shows closed reference data 1104 and associated region 1108.

In the present embodiment, as illustrated with reference to FIGS. 11(*a*) and 11(*b*), there is an overlap region 1116 between the first and second regions. Therefore, the size of the third region in, for example, the x-direction, is not equal to the sum of the sizes of the first and second regions in the x-direction. The overlap region 1116 is provided to ensure that during opening/closing of the access point 104 all measurements will be in at least one of the first or second region boxes, with the amount of overlap taking into account hysteresis.

Using values of the determined covariance matrix and the determined values of the mean vectors, a cubic region is defined about each of the mean vectors of the closed and open groups. The size of the cubic region is determined by calculating upper and lower bound values in each of the x, y and z directions.

As the sizes of the regions are determined using values of a covariance matrix, clearly statistical parameters, such as variance and standard deviation will define the size and/or shape of the regions. I However, in other embodiments the size of the regions need not be defined based on a covariance or other statistical parameter. For example, instead of using the parameters $N_s$, a constant, K, may be used, wherein:

$$\Delta x = \text{abs}(\mu_{ox} - \mu_{cx})$$

$$\Delta y = \text{abs}(\mu_{oy} - \mu_{cy})$$

$$\Delta z = \text{abs}(\mu_{oz} - \mu_{cz})$$

$$\text{High\_Th\_X}_{Closed} = \mu_{cx} + K * \frac{\Delta x}{2}$$

$$\text{Low\_Th\_X}_{Closed} = \mu_{cx} - K * \frac{\Delta x}{2}$$

$$\text{High\_Th\_Y}_{Closed} = \mu_{cy} + K * \frac{\Delta y}{2}$$

$$\text{Low\_Th\_Y}_{Closed} = \mu_{cy} - K * \frac{\Delta y}{2}$$

$$\text{High\_Th\_Z}_{Closed} = \mu_{cz} + K * \frac{\Delta z}{2}$$

$$\text{Low\_Th\_Z}_{Closed} = \mu_{cz} - K * \frac{\Delta z}{2}$$

$$\text{High\_Th\_X}_{Open} = \mu_{ox} + K * \frac{\Delta x}{2}$$

$$\text{Low\_Th\_X}_{Open} = \mu_{ox} - K * \frac{\Delta x}{2}$$

$$\text{High\_Th\_Y}_{Open} = \mu_{oy} + K * \frac{\Delta y}{2}$$

$$\text{Low\_Th\_Y}_{Open} = \mu_{oy} - K * \frac{\Delta y}{2}$$

$$\text{High\_Th\_Z}_{Open} = \mu_{oz} + K * \frac{\Delta z}{2}$$

$$\text{Low\_Th\_Z}_{Open} = \mu_{oz} - K * \frac{\Delta z}{2}$$

In effect, K controls the amount of overlap of the open and closed regions. K may for example have a value of 1.1 to 1.6, and in a specific example, K has a value of 1.5.

In further embodiments, the open region and closed regions have different shapes.

Calibration Process Validation

Following the calibration steps 906, the processor 204 then performs a calibration validation at step 916.

The calibration process validation step 916 includes assessing that particular validation criteria are satisfied. In the present embodiment, there are three validation criteria.

The first validation criteria to be satisfied is that the value of the closed to open distance ClosedToOpenDistance, calculated above, is above a threshold value i.e. that the mean vectors are separated by a distance greater than a pre-determined threshold value. In the present embodiment, a pre-determined threshold value of 500 microTesla is used, however it will be understood that other values of this threshold value may be used.

The second criteria to be satisfied is that N s is greater than a lower threshold value, in the present embodiment, this is 3. However, it will be understood that other values may be used.

The third criteria to be satisfied is that a sufficient number of samples has been collected. In the present embodiment, this condition corresponds to determining that the number of samples in the smallest group is at least 30.

Operation of Device

Following the initialization process 802, the operation of the device 102 is described in the following, with reference to FIG. 8. Following the initialization process, the device 102 is moved from the calibration mode to the low power (reduced power) configuration at step 804 of FIG. 8.

In the low power configuration of device 102, the processor 204 is in a sleep mode and sensor 202 operates in a low power mode. In the low power mode, the sensor 202 operates at a low sample rate. In the low power mode, the sensor 202 performs determination of a potential change of state 806 in which each sample is tested for potential change of state by determining whether, based on a divergence between a sample representation and a representation of the currently recorded state, a change of state at least may have occurred. In the exemplified embodiments determining that a change of state may have occurred may be based on determining that the sample representation is a statistical anomaly with respect to the currently recorded state.

In the sleep mode, the processor 204 operates at reduced power by suspending some of its functionality. When the device 102 is in the low power mode, the processor 204 is configured to be woken up or powered on by sensor 202 when the sensor 202 identifies a potential change of state of the access point.

Following the determination or detection of sample that is indicative of a potential change of state during the change of state determination process 806 (that is, that the sample at least maybe corresponds to a different state that then current state), the device 102 is further configured to move to the higher power configuration. This occurs firstly by the sensor 202 waking the processor 204. The processor 204 is then configured to perform a state classification process 808.

In the following, we described the potential change of state determination process 806 performed by sensor 202, in particular by sensor processor 214 and the state classification process performed by sensor 202.

Potential Change of State Determination Process

Sensor processor 214 is configured to perform a potential change of state determination process 806, more precisely that that a process that determined whether a change of state might have occurred. The change of state determination process involves determining that a sample is representative of a change of state of the access point 104 or representative of a potential change of state of the access point 104.

In the present embodiment, the potential change of state determination process involves detecting a magnetic field sample and performing comparisons between the magnetic field values and threshold values corresponding to currently stored state of the access point 104. An event detection process determines if a change of state has potentially occurred.

In the present embodiment, the potential change of state determination process is performed by components of sensor 202. In further detail, sensing elements 212 sense the magnitude of the magnetic field in the x-direction, y-direction and z-direction. The processor associated with the sensing elements 212, the sensor processor 214, receives output from the sensing elements 212 proportional to the sensed magnitudes, and samples the output at a first, low rate (e.g. 1-5 Hz in some embodiments, or more specifically 2 Hz in some embodiments). The sensor process 214 retrieves state threshold values stored on sensor memory 216. The threshold values that are retrieved correspond to the last updated state of the access point 104. The updating of these values is described in further detail in the following. Briefly, these values are updated in response to detection of an open state, closed state or magnetic tamper state (also referred to herein just as a tamper state), at the state classification process of step 808.

In the present embodiment, the sensor memory 216 is configured to store state threshold values that correspond to the most recently recorded state. For example, if the last recorded state was an open state, then the sensor memory 216 stores the values corresponding to the values of: low $B_x$ threshold, high $B_x$ threshold, low $B_y$ threshold, high $B_y$ threshold, low $B_z$ threshold and high $B_z$ threshold for the corresponding region, in this case the open region. If the last recorded state was a closed state, then the sensor memory 216 stores the corresponding values for the closed region. If the last recorded state was a magnetic tamper state then the sensor memory 216 may store corresponding values for the third region that encompasses both the first and second regions.

In general, it will be understood that the comparisons with the closed region values or open region values correspond to determining if the magnetic field sample is outside the region corresponding to the most recently determined state. As a non-limiting example, if the door is in an open configuration, and the most recently determined state is the open state, then the next sample sampled by sensor 202 at the lower sampling rate should fall inside the open region corresponding to the open state unless a change of configuration of the access point 104 has occurred or some other environmental/tampering has occurred. If the next sample does not fall inside the open region then this is indicative of a potential change of state.

The potential change of state determination process, when the currently stored state (most recently determined state) is open or closed includes comparing the values for each of $B_x$, $B_y$, $B_z$ for the present sample to the corresponding state threshold values for $B_x$, $B_y$, $B_z$ to determine if the sample is indicative that a change of state may have occurred, in comparison to the previously recorded state. In particular, to determine that a change of state has potentially occurred, when the recorded state is the open or closed state, the comparison involves determining that any of the following conditions are satisfied:

$B_x$<low $B_x$ threshold for open/closed state $B_x$>high $B_x$ threshold for open/closed state $B_y$<low $B_y$ threshold for open/closed state $B_y$>high $B_y$ threshold for open/closed state $B_z$<low $B_z$ threshold for open/closed state $B_z$>high $B_z$ threshold for open/closed state.

The above comparisons may also be considered as determining that the measured magnetic field does not lie in the open region (when the recorded state is the open region) for example as represented by open region 706 in FIG. 7. The above comparisons may also be considered as determining that the measured magnetic field does not lie in a closed region (when the recorded state is in the closed region), for example as represented by closed region 708 of FIG. 7.

If the recorded state is the magnetic tamper state then a comparison may involve determining that all of the following conditions are satisfied in order to determine that there may have been a change of state from the tamper state:

$B_x$<high $B_x$ threshold for tamper state $B_x$>low $B_x$ threshold for tamper state $B_y$<high $B_y$ threshold for tamper state $B_y$>low $B_y$ threshold for tamper state $B_z$<high $B_z$ threshold for tamper state $B_z$>low $B_z$ threshold for tamper state.

The above comparison may be considered as determining that the measured magnetic field lies inside the third region, for example, the third region 710 of FIG. 7. However, in some embodiments, such a comparison is only checked if it was previously determined that the measured magnetic field was outside of the third region. In some embodiments, once a tamper state is determined, the device 102 needs to be reset to be removed from being in the tamper state.

In the above description, it is stated that a sample not satisfying the threshold conditions is indicative of a potential change of state. It will be understood that such a sample may be indicative only and in reality, a change of state may not have occurred. For example, the sample may be an outlier or statistical anomaly. Alternatively, the environmental conditions of the access point 104 may have changed. For example, the magnet 110 and device 102 might over time become slightly further apart from each other due to dimensional changes of one or more parts of the access point. Alternatively, the magnet 110 might weaken over time.

The above described processing to determine if the sample is in a pre-determined region may be considered as a comparison of the sample to a boundary of the region.

To illustrate the potential change of state determination process, with reference to FIG. 7, the illustrative sample points 712*a*, 712*b*, 712*c*, 712*d*, 712*e*, 712*f* and 712*g* are discussed. For the purposes of the following discussion, the potential change of state determination process is considered with respect to each of the illustrative sample points 712*a*, 712*b*, 712*c*, 712*d*, 712*e*, 712*f* and 712*g*.

If the last recorded state is the closed state then the sensor processor 214 is performing a comparison to the threshold values corresponding to the closed region 708. In this case, the sensed magnetic fields corresponding to the first illustrative sample point 712*a*, the second illustrative sample point 712*b* and the third illustrative sample point 712*c* would be determined not to be indicative of a potential change of state as these sample points are within the closed region 208. Sensed magnetic field corresponding to the fourth, fifth, sixth and seventh illustrative sample points 712*d*, 712*e* and 712*f* and 712*g* would be determined to be indicative of a potential change of state, as these sample points are positioned outside the closed region 708.

If the last recorded state is the open state then the sensor processor 214 is performing a comparison to the threshold values corresponding to the open region 706. In this case, the sensed magnetic fields corresponding to the first, second, third, fourth and fifth illustrative sample points (712*a*, 712*b*, 712*c*, 712*d* and 712*e*) would be determined to be indicative of a potential change of state from the open state as these sample points lie outside the open region 706. A sensed magnetic field corresponding to the sixth and seventh illustrative sample points 712*f*, 712*g* would be determined to be not be indicative of a potential change of state from the open state as this sample is inside the closed region 708.

Following detection of a sample that is indicative of a potential change of state, the sensor 202 wakes up or activates the processor 204 to move the processor 204 to a higher power mode. A separate wake-up signal may be sent from sensor 202 to processor 204 or the processor 204 may be configured to wake up on receipt of sensor output. In response to receiving the wake-up signal, in the present embodiment, the processor 204 instructs the sensor 202 to operate in a higher power mode, in which the sensor performs sampling at a higher sampling rate (e.g. in the range of 10-100 Hz).

State Classification

Following a determination that a sample is of a potential change of state at step 806, the processor 204 performs a state classification process at step 808 to determine if an actual change of state has occurred. For embodiments for which processing and/or power load are less of a concern, step 806 can be omitted such that, for example, all samples undergo the state classification process 808.

As part of the state classification process 808, the processor 204 receives sensor output from sensor 202 representative of magnetic field samples sensed by sensor 202 at the higher sampling rate. The sensor output is processed and a mathematical representation is produced by the processor 204.

The state classification process is dependent on the last recorded state of the access point 104. This is recorded as the LastState parameter.

The state classification process classifies the access point 104 as an open state, a closed state or a magnetic tamper state. In the present embodiment, the state classification process determines if the sample is in one of an open (810*b*), a closed (810*c*) or a magnetic tamper state (810*a*). Following the classification step, if it is determined that the access point 104 is in one of the open state 810*b* and the closed state 810*c*, the processor 204 then updates state parameters at step 812.

To determine if the magnetic field belongs to the open, closed or magnetic tamper state, processor 204 receives sensor output from sensor 202 that is representative of a sensed magnetic field. The processor 204 processes the sensor output to determine a three dimensional representation of the sensed magnetic field, in the present embodiment, a three dimensional magnetic field vector. In the following, we refer to the three dimensional magnetic field vector of the sample as the sample vector, for brevity.

For example, in some embodiments, the processor 204 calculates a relationship between the sample vector and mean vector of the closed region and the mean vector of the open region and the state classification process is based on this relationship. In the present embodiment, the sensor calculates a first distance between the sample vector and the mean vector of the closed region and a second distance between the sample vector and the mean vector of the open region. The sample can be classified as either open or closed based on whether the sample is closer to the open or closed reference point. There is an exception to this condition, in which the sample is classified as being representative of a magnetic tamper state, regardless of whether the sample is closer to the open or closed reference point. To determine if the sample is representative of a magnetic tamper state the processor 204 is configured to process the sensor output to determine that magnetic tamper conditions are satisfied by the sample.

In further detail, to determine if the sample is to be classified as a magnetic tamper state, the processor 204 calculates a sum of the first distance and the second distance. The processor 204 calculates or uses a pre-calculated value of, the distance between the open and closed mean vectors. If the summed distance relative to the difference between the two mean vectors is greater than a threshold value this is indicative that the sample point is not in the transition path 714 between the open and closed reference states, and therefore is a magnetic tamper state. The value of this threshold may be determined empirically. In some embodiments, the value is 1.5, however, it will be understood that this number may vary in different embodiments.

It will be understood that other methods of classifying the sample point may be implemented.

In further detail, in the present embodiment, the processor 204 calculates the following quantities for the sample vector (represented as $X_i$) relative to the mean open vector $\mu_o$ and mean closed vectors, $\mu_c$.:

$$\text{distanceToClosed}=\sqrt{(X_i-\mu_c)^T*(X_i-\mu_c)}$$

$$\text{distanceToOpen}=\sqrt{(X_i-\mu_o)^T*(X_i-\mu_o)}$$

Using these two calculated quantities, the processor 204 calculates a distance ratio at step 912. In the present embodiment, the distance ratio is between the sum of these two distances and the distance between the open and closed mean points, as follows:

$$distRatio = \frac{distanceToClosed + distanceToOpen}{ClosedToOpenDistance}$$

The distance ratio can be considered as measuring the deviation of the sample point from the transition path 714. A distance ratio equal to 1 corresponds to the sample point being on transition path 714, for a linear transition path. A sample point not on the transition path will have a ratio value of greater than 1. The selection of the distance ratio threshold is representative of the cut-off for a sample point to be considered as a magnetic tamper.

Using the calculated quantities, the processor 204 classifies that sample as open, closed or in a tamper state. It will be understood, that the access point 104 may be in an open configuration but the sample may be classified in the tamper state. Likewise, it will be understood that the access point 104 may be in a closed configuration but the sample may be classified in the tamper state. Therefore, the open state and closed state may be treated as being an open non-tamper state and a closed non-tamper state, respectively.

In the present embodiment, the processor 204 determines that the sample corresponds to the closed state if all of the following conditions are satisfied:

A1: distanceToClosed is smaller than the distanceToOpen
A2: distanceToClosed is smaller than pre-determined value of maximum distance (distMax)
A3: distRatio is smaller than the pre-set value of maximum distance ratio (distRatioMax).

If one or more of these conditions (A1, A2 and A3) are not satisfied, the processor 204 then tests a further set of conditions (B1, B2 and B3). The processor 204 determines that the sample corresponds to the open state if all of the following conditions are satisfied:

B1: distanceToOpen is smaller than the distanceToClosed
B2: distanceToOpen is smaller than a pre-determined maximum distance (distMax)
B3: distRatio is smaller than the pre-set value of maximum distance ratio (distRatioMax).

If one or more of the first set of conditions (A1, A2, A3) is not satisfied and one or more of the second set of condition (B1, B2, B3) is not satisfied, then the state is classified as a tamper state.

Conditions A2 and B2 verifies that the distances between the sample and the open and closed reference points are both lower than a pre-determined maximum value. The maximum value is in determined in dependence on the distance between the first and second reference. Typical values for the maximum distance parameter distMax is half of the distance between the open and closed reference points 702 and 704.

In other embodiments, however, conditions A2 and B2 do not exist. In other words, the processor 204 determines that the sample corresponds to the closed state if all of the following conditions are satisfied:

A1: distanceToClosed is smaller than the distanceToOpen
A3: distRatio is smaller than the pre-set value of maximum distance ratio (distRatioMax).

If one or more of these conditions (A1 and A3) are not satisfied, the processor 204 then tests a further set of conditions (B1 and B3). The processor 204 determines that the sample corresponds to the open state if all of the following conditions are satisfied:

B1: distanceToOpen is smaller than the distanceToClosed
B3: distRatio is smaller than the pre-set value of maximum distance ratio (distRatioMax).

Conditions A3 and B3 correspond to determining that the sample point is sufficiently close to the transition path 714. Conditions A3 and B3 may be considered as magnetic tamper conditions, the satisfaction of which is indicative that the access point 104 is in a magnetic tamper state. A typical value for the pre-set maximum is 2. However, this value may be determined experimentally. For example, a value of 1.5 is experimentally found to catch a magnetic tamper. However, this value selected can be dependent on the installation set up. For example, it is found that for a hinged access point 104, the ratio is no greater than 1.02 during the transition even when there is no tamper. With a choice of value of 2, conditions A3 and B3 are satisfied if sum of the distances to the open and closed reference points is smaller than twice the distance between the open and closed reference points.

At the end of the state estimation process 808, the lastState variable, previously initialised at step 612, is assigned to one of "open", "closed" or "tamper", depending on the outcome of the state classification process.

In the present embodiment, the state classification process involves determining a distance vector between the sample point and the open and/or closed reference point and one or more mathematical operations are performed on this distance vector. In other embodiments, the distance vector is additionally or alternatively used to determine that the sample is within a pre-determined region, for example, the open region 706 or the closed region 708. In some further embodiments, the distance vector is used to determine that the sample is within regions that are different to the region used for the change of state determination process, for example, regions that are smaller and/or have different shapes. Further detail on such embodiments is provided with reference to FIG. 13.

With reference to FIG. 7, to illustrate further how the state classification process works in the present embodiment, we discuss the illustrative sample points 712*a*, 712*b*, 712*c*, 712*d*, 712*e*, 712*f* and 712*g* and their classification.

With regard to the first illustrative sample point 712*a*, this point is closer to the closed reference point 704 (corresponding to the closed mean vector) than to the open reference point 702 (corresponding to the open mean vector) thus satisfying condition A1. The distance to the closed reference point 704 is also smaller than the half of the distance between the open and closed reference points and thus condition A2 is satisfied. The point 712*a* also lies on the transition path 714 and therefore satisfies condition A3. Point 712*a* is therefore classified as closed state.

With regard to the second illustrative sample point 712*b*, this point is closer to the open reference point 702 than to the closed reference point 704 thus condition A1 is not satisfied. Moving on to the second set of conditions, clearly condition B1 is satisfied. Conditions B2 and B3 are also satisfied by sample point 712*b*, as this point is within half the distance between the open and closed reference points and lies on transition point 714. Therefore, the sample point 712*b* is classified as open state.

With regard to the third, fourth and fifth illustrative sample points 712*c*, 712*d* and 712*e*, these sample points are closer to the closed reference point 704 than the open reference point 702 and thus satisfy condition A1. With regard to condition A2 (and B2) this test prevents a point from being classified as belonging to a given state if it is too far from the reference of that state (even if the other conditions are satisfied). In this example, points 712*c* satisfies condition A2, however, points 712*d* and 712*e* do not satisfy condition A2. However, for a distRatioMax value of 1.02, none of the points 712*c*, 712*d* and 712*e* is sufficiently close to transition path 714 to satisfy condition A3. Therefore, these points are classified as magnetic tamper.

With regard to the sixth illustrative sample point 712*f*, this point is closer to the open reference point 702 than the closed reference point 704 and therefore does not satisfy condition A1 but does satisfy condition B1. Sample point 712*f* also satisfies condition B2. However, this point is not sufficiently close to transition path 714. Therefore, sample point 712*f* does not satisfy condition B3 and is therefore classified as a magnetic tamper.

With regard to the seventh illustrative sample point 712*g*, this point is closer to the open reference point 702 than the closed reference point 704 and therefore does not satisfy condition A1 but does satisfy condition B1. Sample point 712*g* also satisfies condition B2. In contrast to sample point 712*f*, this point is sufficiently close to transition path 714. Therefore, sample point 712*g* does satisfy condition B3 and is therefore classified as closed state.

In the present embodiment, the state classification process involves calculating distances and determining if the sample is closer to a first reference vector or a second reference vector together. In other embodiments, the state classification process involves determining if the sample points are in pre-determined regions. These pre-determined regions may correspond to the pre-determined regions used for the change of state determination process or may be different regions. Examples are provided and described with reference to FIG. 13.

Update State Parameters

At step 812, state parameters are updated, and stored in the sensory memory 216, based on the sample magnetic field that has been processed in the state classification process 808. This update step includes updating the values representative of the geometric center points (the mean vectors) of the open and closed regions. Following the update of these points, other state parameters are updated. The update of the state parameters re-define the open and closed region.

The update of the parameters is performed using an alpha filter. The alpha filter acts to smooth parameter updates. For a current estimate of a parameter $\hat{x}_k$, the alpha filter is defined as:

$$\hat{x}_k=(1-\alpha)\hat{x}_{k-1}+\alpha * z_k$$

The variable $\hat{x}_{k-1}$ represents the previous value for the parameter. The variable z k is a current measurement.

In further detail, in the present embodiment, the mean vector for each of the open and closed region are updated as follows:

$$\mu_k=(1-\alpha)\mu_{k-1}+\alpha * X_k$$

where $X_k$ is the three dimensional magnetic field of the new sample. The value of a is pre-determined and set during initialization step 802. In some embodiments, the value of a is 0.99.

In the present embodiment, the state parameters are not updated if the state estimation process indicates that the magnetic field is representative of the access point 104 being in a magnetic tamper state 810*a*.

If the state estimation process determines that the state is open (step 810*b*) or closed (step 810*c*) then the method returns the device 102 to the low power mode, which involves the processor 204 instructing the sensor 202 to return to the lower power mode in which the sensor 202 samples at a lower sample rate.

In the present embodiment, if the state estimation process determines that the access point 104 is in the magnetic tamper state, then sensor 202 is kept in the active mode for extra period of time. In the present embodiment, the extra period of time is 5 seconds. Following the extra period, the state estimation process continues to be performed using further samples until either the extra period of time elapses or the state estimation step determines that the access point 104 is in the open or closed state. If the extra period of time elapses, then processor 204 instructs the sensor 202 to go to the lower power mode.

On commanding the sensor 202 to return to the low power mode, in the present embodiment, the processor 204 may also return to its previous sleep state. In some embodiments, the processor 204 may perform one or more further actions before returning to the previous low power mode. Such an action may include, for example, instructing the transceiver 208 to transmit of a notification of a change of state and/or the new state to the control hub 114.

In the above-described embodiments, the change of state determination process is performed by comparing a magnetic field sample to state threshold values that are representative of one or more cubic regions. In the following, further embodiments, in which the region is not cubic are described. In particular, in these further embodiments, the change of state determination process and/or the state classification process are performed using a region that has a circular cross-section. In three dimensions, the regions may be spheres or cylinders. In two dimensions, the region may be a circle.

In a first further embodiment, in place of the six state threshold values representative of a cubic region, sensor memory 216 is configured to store a single threshold value. Sensor processor 214 is therefore configured to calculate a difference vector $B_{diff}=B_{sample}-B_{ref}$ between the sensed magnetic field and the reference vector. Sensor processor 214 is further configured to determine a magnitude of the difference vector by calculating a sum of squares of the components of the difference vector. A square root of this sum is then calculated. The determined value of magnitude is compared to the single stored threshold value. In such an embodiment, the threshold value is representative of a radius of a three dimensional sphere in magnetic field space centred at $B_{ref}$, and determining that the magnitude of the distance vector is greater than the single stored value can be considered as determining that the sample lies outside the sphere.

Figure 12:
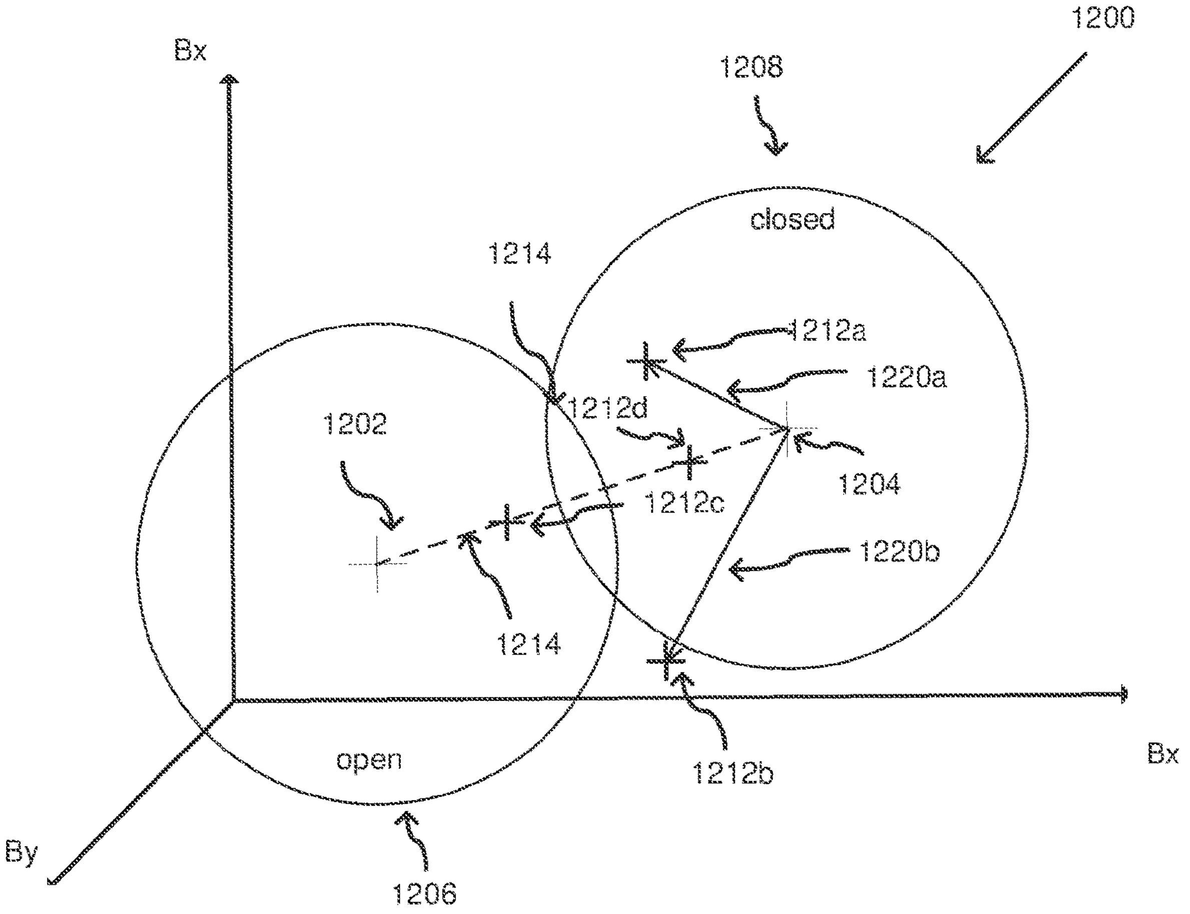
FIG. 12 is a three-dimensional plot in magnetic field strength space illustrating regions and illustrative sample points.

In the above described embodiment of FIG. 8, cubic regions, as depicted in FIG. 7 were used as part of the potential change of state determination process. In other embodiments, substantially the same method of FIG. 8 is used but with regions having a different shape. As an example embodiment, FIG. 12 depicts a plot 1200 illustrating spherical regions. It will be understood that in an embodiment, the method of FIG. 8 is provided with the replacement of the cubic regions of FIG. 7 with the spherical regions of FIG. 12. It will be understood that suitable modifications of the method of FIG. 8 will be made, for example, instead of requiring a set of threshold values that define a cubic region, only a single parameter is required to define the size of the spherical region. A spherical region can therefore be defined using the mean vector and a single parameter representative of the value of the radius.

FIG. 12 shows a plot 1200 illustrating spherical regions. The axes of the plots of FIG. 12 are as described with reference to FIG. 7. FIG. 12 shows a first mean vector 1202 corresponding to the open state and a second mean vector 1204 corresponding to the closed state. First mean vector 1202 and second mean vector are determined as described for sample points 702 and 704 of FIG. 7.

FIG. 12 shows a first, open region 1206, a sphere with a first radius, drawn about the open mean vector. FIG. 12 shows a second, closed region 1208, a sphere with a second radius, drawn about the closed mean vector 1204. For clarity, FIG. 12 depicts the open and closed mean vectors as points in three dimensional space, however, the open mean vector 1202 will be understood to be a vector drawn from the origin to the centre of the open region 1206 and the closed mean vector will 1204 will be understood to be a vector drawn from the origin to the centre of the closed region 1208. The open mean vector 1202 therefore has an end point at the centre of the open region 1206. The closed mean vector 1204 therefore has an end point at the centre of the closed region 1206. FIG. 12 also shows a transition path 1214 and overlap region 1216. The expected transition path 1214 corresponds substantially to transition path 714 of FIG. 7 and the overlap region 1216 correspond substantially to overlap region 1116 of FIG. 11. While the terms mean vector is used, it will be understood that the mean vector is an array or set of three numbers (three in the case of the magnetic field being measured in three dimensions) respectively representing a mean value of magnetic field strength in the x, y and z directions. In other embodiments, the vectors/magnetic field strength may be represented using other co-ordinate systems (for example, polar or spherical polar) or with reference to a different origin.

FIG. 12 shows four illustrative sample points 1212*a*, 1212*b*, 1212*c* and 1212*d*. Sample points 1212*a* and 1212*d* are inside the spherical closed region 1208. Sample point 1212 is inside the open spherical region 1206. Sample point 1212*b* is outside both the open and closed spherical regions.

A first difference vector 1220*a* is shown in FIG. 12 between illustrative sample point 1212*a* and closed mean vector 1204. First difference vector is contained inside closed region 1208. A second difference vector 1220*b* is shown in FIG. 12 between illustrative sample point 1212*b* and closed mean vector 1204.

With respect to a change of state determination step corresponding to step 806, for a previously recorded closed state, it will be understood that sample points 1212*a* and 1212*d* will be considered as being inside the closed spherical region 1208 and therefore not indicative of a potential change of state. Points 1212*b* and 1212*c* will be considered outside the closed spherical region 1208 and therefore indicative of a potential change of state.

As discussed above, the size of the spherical region is represented by a threshold value corresponding to a radius of a sphere. However, this value will be stored to a digital resolution. The digital resolution for example because of limited numerical precision, which is either restricted by the hardware and/or may be selected. A particular digital resolution may speed up the comparison. Therefore, where the words sphere and spherical region and cylindrical region are used above, it will be understood that the regions approximate up to a digital resolution. The regions are therefore actually multi-dimensional polygons with a finite number of faces that approximate a sphere. In an example embodiment, the value is defined up to 3 bits.

The spherical region may allow for a tight control over allowable magnetic field change that is independent of the direction of change of the magnetic field caused by movement of the door/window. When used to detect a change of state, this may result in a more sensitive detection of the change of state.

In the above-described embodiments, the potential change of state determination involves determining if a sample is inside a region and the state classification process uses comparisons of distance between the sample and the mean values of the region to classify samples, for example using the same principles as steps 808 and 810 of method 800 described above.

However, in other embodiments, if the difference vector is greater than the threshold this is taken to be an actual change of state, rather than just a potential change of state. For example, in such embodiments, a closed state may assumed when a sample point is within the closed region associated with the closed state, but may be assume to be not in the closed state (e.g. it may in the open state or a tamper state) when a sample point Is outside the closed region.

In further embodiments, both the potential change of state determination process and the state classification process includes the step of determining if the sample lies in a particular region. It will also be understood that, in accordance with embodiments, the regions may be different, for example, in shape or size. For example, in such embodiments, a potential closed state may be assumed when a sample point is outside a first closed region associated with the closed state, but then compared to a second region, within the first region, to determine whether or not is in the closed state or not.

Figure 13:
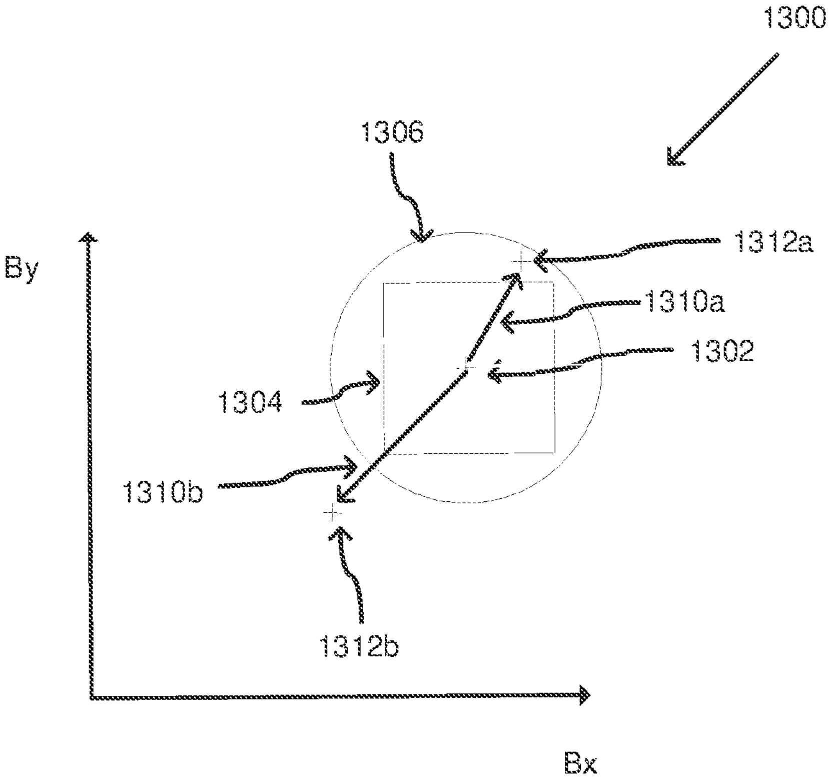
FIG. 13 is a two-dimensional plot in magnetic field strength space illustrating regions.

FIG. 13 is illustrative of a further embodiment in which a first region is used for the state determination process and a second, different region is used for the state classification process. FIG. 13 is a two-dimensional plot 1300 showing a projection of the mean vector 1302 and a first pre-determined region, herein referred to as a first region 1304 and a second pre-determined region, herein referred to as second region 1306 centred about the same mean vector 1302. For clarity FIG. 13 shows only a first and second region centred about mean vector 1302 determined using closed data. In this embodiment described with reference to FIG. 13 and FIG. 14, a first and second pre-determined region is provided about the same mean vector 1302 corresponding to the closed state and the first pre-determined region is used to determine a potential change of state from a closed state and the second pre-determined region is used to perform a state classification process for classifying the state as either closed or not-closed. FIG. 13 also shows a first sample point 1312*a* and a first difference vector 1310*a* and a second sample point 1312*b* and a second difference vector 1310*b*.

In further embodiments it will be understood that two further pre-determined regions may be defined for the open data i.e. to provide four regions in total.

Figure 14:
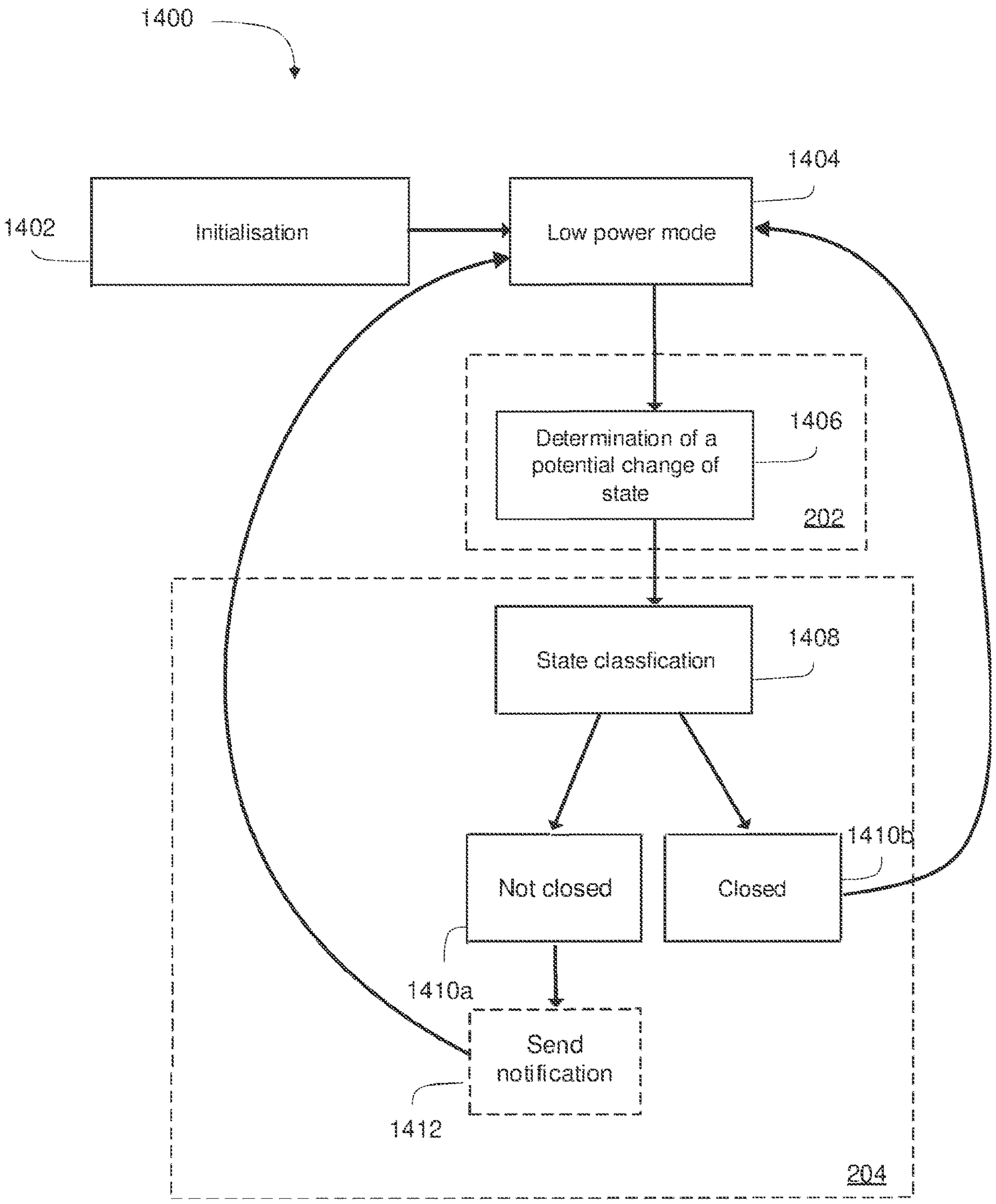
FIG. 14 is a flowchart representing a method of determining a state of an access point using the sensing device, in accordance with a further embodiment.

FIG. 14 illustrates in overview, a method 1400 of operating the device 102 using the first pre-determined region 1304 and the second pre-determined region 1306 as depicted in FIG. 13, in accordance with a further exemplary embodiment. It will be understood that method 1400 shares a number of steps with method 800, as described with reference to FIG. 8.

In particular, initialisation step 1402 corresponds closely to step 802 of FIG. 8. In particular, at initialisation step 1402, threshold values corresponding to cubic region 1304 are stored.

In addition, step 1404 corresponds substantially to step 804. For brevity, this step is not described in the following.

In this embodiment, from step 1404 onwards, the device 102 is in the low power mode and sensor 202 is sampling at a low sampling rate. The sensor processor 214 performs the change of state determination process, substantially as described with reference to step 806 of FIG. 8, using the threshold values corresponding to boundary of first pre-determined region 1304 which is a cubic region.

The method 1400 varies from the method of FIG. 8, at step 1408, when device 102 is switched to the higher power mode and performs the state classification process. At step 1408, as part of the state classification mode, the sensor 202 senses at least one further sample at the higher sampling rate. The processor 204 then uses the second pre-determined region 1306 which is a spherical region as part of a state classification process 1408. As part of this process, a difference vector between mean vector 1302 and a sample point is calculated. For example, difference vector 1310*a* between mean vector 1302 and first sample point 1312*a* or difference vector 1312*a* between mean vector 1302 and second sample point 1312*b*.

As part of the state classification process 1408, it is determined if the further sample is inside the second pre-determined region 1306. By way of example, if the further sample point is the first sample point 1312*a*, first difference vector 1310*a* is calculated. Using the calculated magnitude of the first difference vector 1310*a* (calculated as described with reference to FIG. 12), the processor 204, can determine, by comparing the magnitude to the radius of the spherical region 1306, if the first sample point 1312*a* lies inside the second pre-determined region 1306 thereby to classify the state of the access point 104 for that sample. It is determined that the first sample point 1312*a* lies in the second pre-determined region 1306 and therefore it is determined that the sample point is representative of a closed state (step 1410*b*).

As a further example, if the further sample point is the second sample point 1312*b*, second difference vector 1310*b* is calculated. Using the calculated magnitude of the second difference vector 1310*b* (calculated as described with reference to FIG. 12), the processor 204, can determine, by comparing the magnitude to the radius of the spherical region 1306 if the second sample point 1312*b* lies inside the second pre-determined region 1306 thereby to classify the state of the access point 104 for that sample. It is determined that the second sample point 1312*b* lies outside the second pre-determined region 1306 and therefore it is determined that the sample point is representative of a non-closed state (step 1410*a*).

The state classification process 1408 determines if the sample is representative of a closed state or a not-closed state. The not-closed state may correspond to an open or tamper state.

In the above-described embodiment, a further sample is taken as part of the state classification process. It will be understood that, in other embodiments, the same sample that was used for determining the potential change of state may be used for the state classification process.

As a further contrast to the method of FIG. 8, the update state parameters step is skipped or is at least modified. In some embodiments, an update step involving an update of the mean vector is performed following a determination that the state is a closed state, substantially as described with reference to FIG. 8. Alternatively, no update is performed at all and, instead, a re-calibration process is periodically performed, for example, at regular intervals or is performed in response to different device events (for example, the senor being turned on). In the present embodiments, the device is returned to low power mode after classifying the state as closed or not-closed.

If the state is determined as not closed the method may include an optional further action step before returning to the low power mode. The further action may be, for example, sending a notification signal, step 1412, to the control hub 114.

The open and closed spheres are contained inside the open and closed cuboids. $B_y$ performing the change of state determination process in a smaller cuboid region, the system can utilize a tighter range of magnetic field defined by the cubic field to save power. This may be particularly suited to data associated with a closed state, which is tightly grouped in comparison to data associated with an open state (see for example, FIG. 10).

In other embodiments, the first, outer region for determining potential change of state may be a cuboid, and the second, inner region for then determining the actual state may be spherical.

In the above-described embodiments, sensor 202 is described as part of device 102. It will be understood that in alternative embodiments, a sensor device having one or more physically separate components is provided. A non-limiting example of a sensor device having two physically separate components is described with reference to FIGS. 15 and 16.

Figure 15:
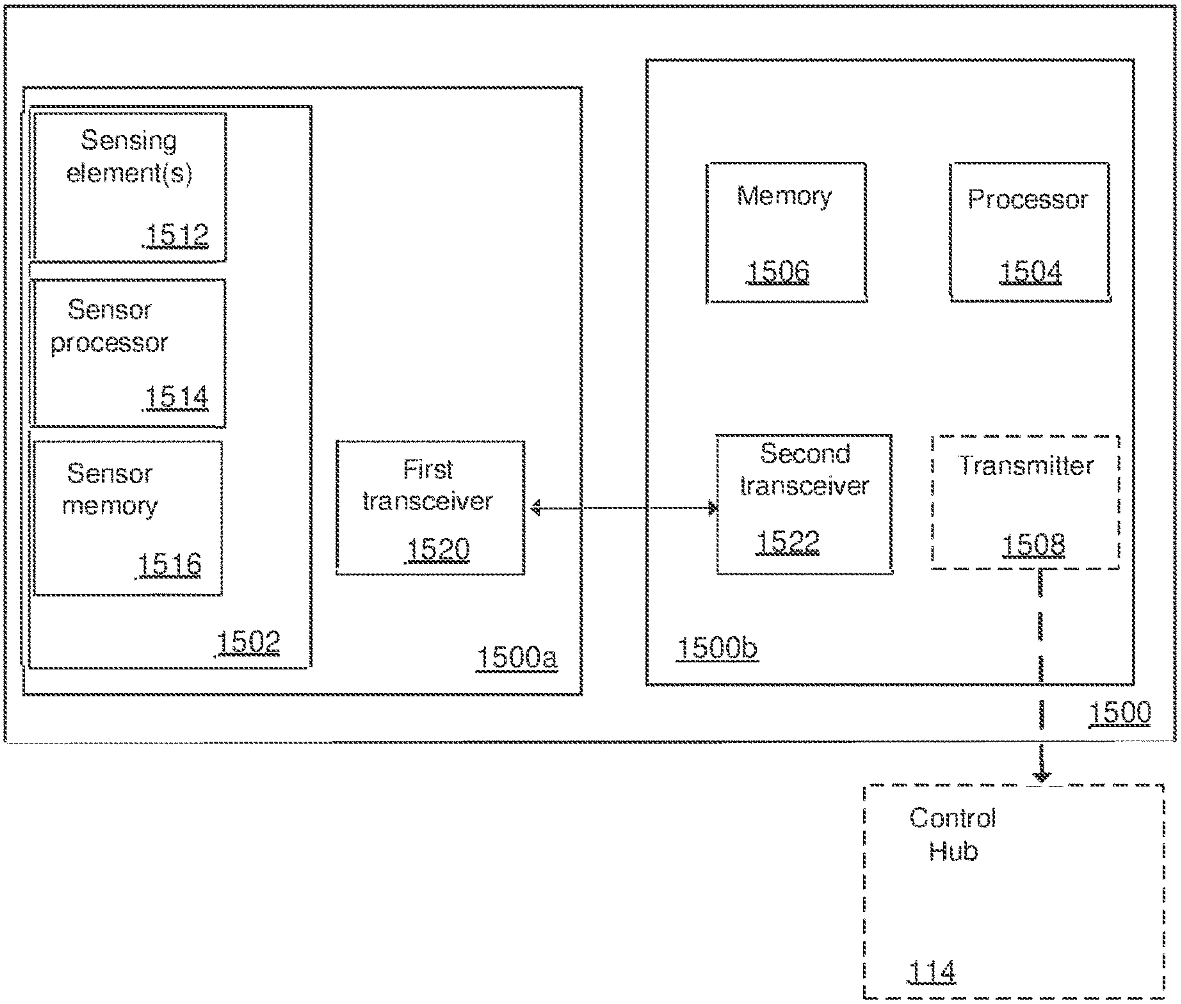
FIG. 15 is a schematic diagram of a device and physically separate sensor, in accordance with a further embodiment.
Figure 16:
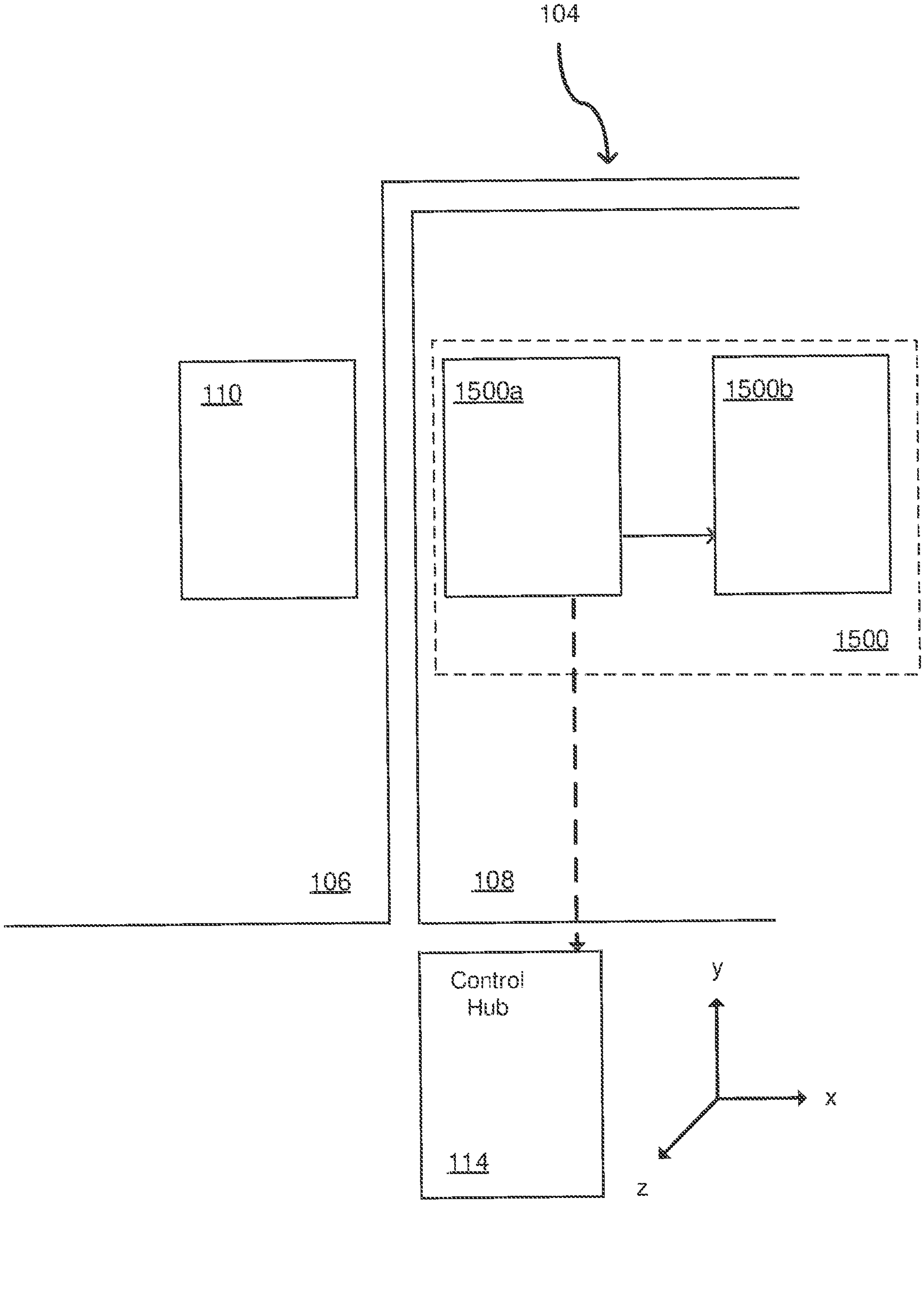
FIG. 16 is a schematic diagram of the device and physically separate sensor installed on an access point.

FIG. 15 shows device 1500 having a first part 1500*a* and a second part 1500*b*. FIG. 16 shows installation of device 1500 at access point 104. First device 1500*a* is installed at a sensing position on second component 108. Second device 1500*b* is installed at a remote position relative to the sensing position. First part 1500*a* is henceforth referred to as local device 1500*a*. Second part 1500*b* is henceforth referred to as remote device 1500*b*.

Local device 1500*a* has a sensor 1502 corresponding substantially to sensor 202 described with reference to FIG. 2. In particular, sensor 1502 has sensing element(s) 1512 corresponding to sensing elements 212, a sensor processor 1514 corresponding to sensor processor 214 and sensor memory 1516 corresponding to sensor memory 216.

Remote device 1500*b* has at least the following components corresponding to device 202: processor 1504 corresponds to processor 204 and memory 1506 corresponds to memory 206. Second part 1500*b* may also have a transmitter 1508 for transmitting one or more signals to control hub 114, corresponding to transmitter 208.

In contrast to device 102, device 1500 has a first transceiver 1520 and second transceiver 1522 for communicating one or more signals between the local device 1500*a* and remote device 1500*b*.

Local device 1500*a* is configured to receive, via first transceiver 1520 one or more state threshold value update signals from remote device 1500*b*, in particular values defining region threshold values for the present state. In addition, local device 1500*a* is configured to transmit, sensor output, via first transceiver 1520, to remote device 1500*b*, in response to determining that the magnetic fields sensed by sensing elements(s) 1512 are representative of a change of state of the access point 104.

Remote device 1500*b* is configured to receive, via second transceiver 1522, the sensor output from local device 1500*a*. The remote device 1500*b* is configured to transmit, via second transceiver, one or more state threshold value update signals to local device 1500*a* in response to completion of the state classification process, i.e. updated dimensions of the first, second, and third regions.

In a further embodiment, sensor memory 1516 is provided as part of second device 1500*b*. It will be understood that in such an embodiment, the first device 1500*a* may not need to receive the one or more state threshold value update signals from second device 1500*b* and a transmitter may be provided in place of the first transceiver and a receiver may be provided in place of second transceiver.

A skilled person will appreciate that variations of the enclosed arrangement are possible without departing from the invention. The following non-limiting examples of variations are provided.

In the above-described embodiments, the access point 104 is described as having a door and a doorway. However, it will be understood that the access point 104 may be any mechanism that has two physically separate components separable to provide an opening. The access point 104 may be a window/window-frame or a gate/gate-post. In some embodiments, the access point 104 has a moveable component (for example, the door/window/gate) and a fixed component (for example, the door-frame/window-frame/gate-post). However, it will be understood that in that the movement can be a relative movement between the first component 106 and the second component 108. In some embodiments, the access point 104 may have two moveable components that are moveable relative to each other.

Further, in the above-described embodiments, device 102 is described as having a transmitter 208. In further embodiments, device 102 may further comprise a receiver. For example, the transmitter and receiver may be provided as part of a transceiver. In some embodiments, the receiver receives input comprising update data for updating code and/or data stored in the memory component. These instructions may be received from an external source, for example the control hub 114.

In such embodiments, the device 102 may be configured to perform a recalibration process, as described in the following this may be performed periodically, for example, following a predetermined timing program or in response to the occurrence of an event. In some embodiments, the recalibration is performed in response to a request to arm an alarm system that includes device 102 as a component part.

The request is received from the control hub 114, via the receiver, and processor 204 responds by instructing sensor 202 to take a sample of the magnetic field. If the new sample is inside the pre-determined open or closed region then the state parameters are updated accordingly. For example, if the sample is inside the closed region, then the closed mean vector and/or region is updated using the new sample. On the other hand, if the new sample is outside the closed region, then the signal may be communicated back to the control hub 114 to indicate this fact. The control hub 114 may then respond by declining to set the alarm.

As a further non-limiting example, in the above-described embodiment, the k-means algorithm was described. However, it will be understood that in other embodiments, other machine learning or statistical techniques may be used as part of a state classification process. For example, in the field of machine learning other classification processes may be implemented. For example, other clustering analysis algorithms may be used. Other clustering algorithms may be suitable, for example, centroid based clustering, connectivity based clustering, and distribution based clustering, density-based clustering. Other classifiers may be suitable, for example, linear classifiers, including logistic regressions, support vector machines or linear discriminant analysis. The algorithm described herein may allow for easy installation and calibration and a low complexity in the operational mode.

As a further non-limiting example, in embodiments where the sensor is physically separate from the device, for example, as described with reference to FIGS. 15 and 16 the installation/pre-calibration and/or calibration process may include the further step of pairing between the sensor devices with the device.

As a further non-limiting example, the Figures herein include three-dimensional plots produced in a co-ordinate system that have axes corresponding to the co-ordinate system 112 shown in FIG. 1. However, it will be understood that the processor 204 may be configured to perform one or more co-ordinate transformations between a frame of reference of the system and a frame of reference of the access point 104.

In the above-described embodiments, it will be understood that the sensor processor 214 is generally a simpler processor than processor 204. For example, in some embodiments, sensor processor 214 can retrieve values from sensor memory 216 but is not able to perform any user specified programs.

In the above-described embodiments, the device 102 is returned to the low power mode following detection of a tamper state. In further embodiments, the processor 204 may further process the sample to determine if it satisfies one or more further conditions. For example, the processor 204 may test that the tamper condition that was indicative of the tamper state is no longer satisfied.

In further example embodiments, in response to being woken up or activated, the processor 204 may perform one or more checks prior to performing the state classification process. For example, the first sensor output provided to the processor 204 may include information of the present sample point and the processor 204 may perform a confirmation step to check that the sensor point is outside the region thereby to determine if further action is required.

In a further example, in response to being woken up or activated, the processor 204 may send a notification signal via transmitter 208 to control hub 114. For example, if the change of state determination process is indicative that the access point 104 has been opened or is no longer in the closed configuration, the transmitter 208 may send the notification to the control hub 114. In some embodiments, the device 102 sends a tamper notification signal to control hub 114 in response to detecting a magnetic tamper.

In the above-described embodiments, processing of samples collected at a higher sampling rate is described to determine a state of the access point 104 as part of a state classification process. It will be understood that the state determination process may be performed on only a single sample collected at the higher sampling rate. In such an embodiments, by instructing the sensor 202 to collect sample at a higher sampling rate, even though only one sample is collected, the sample that is collected is collected more quickly than if the sensor 202 was operating at the lower sample rate and therefore the device responds quickly to a potential change of state.

In further embodiments, more than one sample is collected at the higher sampling. In an example embodiment, two samples are collected at the higher sampling rate, and only the second sample is used for the state determination process. In a further example embodiment, more than one sample is collected at the higher sampling rate and more than one sample is used for the state determination process. For example, processor 204 may calculate an average magnetic field vector and the state determination process is performed on the average magnetic field vector.

In some embodiments, a sample collected at the lower sampling rate is used by processor 204 and combined with the sample(s) collected at the higher sampling rate as part of the state determination process. The combined sample is then used for the state determination process. In some embodiments, the processor 204 is configured to return the sensor 202 to its lower power mode after a pre-determined number of samples are collected by the sensor 202 in the higher power mode and/or after a pre-determined time has elapsed. In a further embodiment, only a single sample is collected by the sensor 202 in the higher power mode before the sensor 202 is returned to the lower sampling rate. By limiting the number of samples collected in the higher power mode, the power consumption of the device may be minimized.

In the above-described embodiments, a wake-up signal is described. However, it will be understood that sensor processor 214 need not send a separate signal and any form of sensor output may be sufficient to wake up the processor 204. For example, at the lower rate the sensor 202 may provide no indication of the sensed magnetic field, and may only give the sensed magnetic field if it is outside the "box". That first value that is outside the box may be the wake up signal for example, or it could be a first signal at the higher sampling rate (which could potentially precede the at least one samples used to determine the state determination process).

In an event that the state determination process determines that the state of the access point 104 has changed, the second processing circuitry is configured to control transmission of a notification of the change of state to a control hub 114. The device may further comprise a transceiver for transmitting the notification. The second processing circuitry may be configured to instruct the transceiver to transmit the notification. The transceiver may be inactive when the second processing circuitry is in said low power state (e.g. a sleep state) or off state.

In the above-described embodiments, the sensor processor 214 is configured to compare a sensed magnetic field to six threshold values. In the above described embodiments, sensor memory 216 is configured to store the six threshold values at any one time and these values are updated, as necessary, following the state estimation process. However, it will be understood that in other embodiments, the sensor memory 216 stores state threshold values for all three regions, together with the last known state parameter, and the sensor processor 214 is configured to select which state threshold values are to be compared to the present magnetic field sample based on the last know state parameter. In such embodiments, the sensor memory 216 is configured to store values for 18 state threshold parameters together with a value for the last known state and these values are updated following a completion of the state estimation process.

In the embodiments described with reference to FIG. 8, at step 806 a potential change of state is determined by sensor 202. It will be understood that in some embodiments, step 806 is replaced by a change of state determination process in which a change of state is determined by sensor 202, in contrast to a potential change of state. In such embodiments, the sensor 202 outputs sensor output representative of a change of state and therefore steps 808, 810 and 812 are not required.

With reference to FIG. 9, there is described a calibration process for device 102. The calibration process is intended to be performed when the device is installed at the access point. In a further embodiment, a calibration process is performed for the device 102 in which a first representation corresponding to the closed state and a second corresponding to the open state is determined and these representations may be used in determining whether the access point is in a closed state by comparing a further sample representation with at least the first, closed state representation.

The installer installs the magnet and device at the access point. The installer or other operator places the device into calibration mode. In calibration mode, a pre-defined calibration time window is defined. During the pre-defined time window, the installer or other operator alternates the first and second components of the access point between a plurality of open and closed configurations and the sensor 202 sensing the magnetic field in the plurality of configurations. The sensor output is collected and stored as reference data. The installer is instructed to manipulate the access point to place the access point into each of the open and closed configurations for a particular portion of the pre-defined time window. In some embodiments, this portion is a minimum percentage of 25 to 35% of the pre-defined time window. In some embodiments, the minimum percentage is substantially 30%. In the present embodiment, the sensor output is transmitted from sensor 202 to processor 204 and stored as reference data in memory 206.

Following the end of the reference data collection i.e. following the end of the time window, the processor 204 processes the reference data to determine the first and second representations. The processing of the reference data includes performing a grouping process on the collected reference data, as described with reference to FIGS. 8 and 9. This process may be a machine learning process, for example, application of a k-means clustering algorithm to the collected reference data.

Accordingly, it will be understood that the present invention has been described above purely by way of example, and modifications of detail can be made within the scope of the invention. Each feature disclosed in the description, and (where appropriate) the claims and drawings may be provided independently or in any appropriate combination.

What is claimed is:

1. A device for determining a state of an access point, the access point having a first component and a second component that are separable from each other to create an opening to access a premises or part thereof, wherein a magnet is mounted on one of the first or second components of the access point, and wherein the device comprises:

a sensing component for sensing a magnetic field and producing sensor output in response to sensing the magnetic field, wherein the sensing component is mounted on the other of the first or second components of the access point from the magnet; and processing circuitry configured to process said sensor output to produce a sample representation of the sensed magnetic field, wherein the processing circuitry is further configured to:

perform a state classification process on the sample representation to determine a state associated with the access point, wherein the state classification process is based on a relationship between the sample representation and (i) a first representation representative of the access point being in a closed state and (ii) a second representation representative of the access point being in an open state, wherein the state is determined to be one of a group of states comprising an open state and a closed state, wherein the group of states further comprises a tamper state, and wherein the state classification process further comprises determining that at least one magnetic tamper condition is satisfied by the sample representation.

2. The device of claim 1, wherein the state classification process comprises:

comparing the sample representation with the first representation and comparing the sample representation with the second representation.

3. The device of claim 1, wherein the at least one magnetic tamper condition is satisfied when the sample representation lies outside an expected transition path between the first representation and the second representation.

4. The device of claim 1, wherein the at least one magnetic tamper condition is based on:

a first quantity that is a sum of a first measure of distance between the sample representation and the first representation and a second measure of distance between the sample representation and the second representation.

5. The device of claim 4 wherein the at least one tamper condition is based on a second quantity that is a third measure of distance between the first representation and the second representation.

6. The device of claim 5, wherein the at least one tamper condition is based on a value of a ratio between a first quantity and a second quantity being smaller than a predetermined threshold value.

7. The device of claim 1, wherein the state classification process comprises determining that the sample representation is closer to either the first representation or the second representation and classifying the state based on which of the first and second representations is closer.

8. The device of claim 1, wherein the state classification process comprises determining whether the sample representation is in a first region about the first representation and/or in a second region about the second representation.

9. The device of claim 8, wherein the processing circuitry is configured to transmit values corresponding to boundaries of the first and/or the second regions to further processing circuitry for use in a change of state determination process.

10. The device of claim 8, wherein the first and second regions overlap to form an overlap region.

11. The device of claim 8, wherein the first and second regions each have a size in dependence on one or more statistical parameters determined from reference data.

12. The device of claim 1, wherein the first representation and the second representation are determined using a machine learning process performed on reference data.

13. The device of claim 12, wherein the machine learning process comprises applying a k-means clustering process on reference data.

14. The device of claim 1, wherein the sample representation comprises a three-dimensional vector wherein each component of the three-dimensional vector corresponds to a measurement of the magnetic field in a spatial dimension.

15. The device of claim 1, wherein the processor is further configured to perform an update process on at least one of the first and second representations using the sample representation and an outcome of the state classification process.

16. The device of claim 15, wherein the update process comprises updating the first representation using the sample representation if the sample representation is determined to be representative of the access point being in the closed state and updating the second representation using the sample representation if the sample representation is determined to be representative of the access point being in the open state.

17. The device of claim 1, wherein the processor is configured to perform a calibration process thereby to determine the first and second representations, wherein the calibration process comprises:

operating the sensing component to sense the magnetic field when the first and second components of the access point are arranged to be in the at least one state thereby to collect reference data corresponding to that state;

determining the first and second representations using at least the collected reference data.

18. The device of claim 17, wherein determining the first and second representations from the collected reference data comprises performing a machine learning process on at least the collected reference data.

19. A kit of parts comprising the device of claim 1 and a magnet for mounting on one of the first or second components of the access point.

20. A method of determining a state of an access point, the access point having a first component and a second component that are separable from each other to create an opening to access a premises or part thereof, wherein a magnet is mounted on one of the first or second components of the access point and the sensing component is mounted on the other of the first or second components of the access point from the magnet, the method comprising:

receiving a sensor output from a sensing component in response to the sensing component sensing a magnetic field;

processing said sensor output to produce a sample representation of the sensed magnetic field; and performing a state classification process on the sample representation, wherein the state classification process is based on a relationship between the sample representation and (i) a first representation being representative of the access point being in a closed state and (ii) a second representation being representative of the access point being in an open state, wherein the state is determined to be one of a group of states comprising the open state and the closed state, wherein the group of states further comprises a tamper state, and wherein performing the state classification process further comprises determining that at least one magnetic tamper condition is satisfied by the sample representation.

21. A non-transitory computer readable medium comprising instructions operable by processing circuitry to perform the method of claim 20.

* * * * *